United States Patent
Araki

(10) Patent No.: US 8,264,717 B2
(45) Date of Patent: Sep. 11, 2012

(54) IMAGE FORMING APPARATUS, INFORMATION PROCESSING APPARATUS, INFORMATION PROCESSING METHOD, INFORMATION PROCESSING PROGRAM AND STORAGE MEDIUM

(75) Inventor: Ryoji Araki, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 1471 days.

(21) Appl. No.: 11/477,656

(22) Filed: Jun. 30, 2006

(65) Prior Publication Data

US 2007/0008583 A1  Jan. 11, 2007

(30) Foreign Application Priority Data

| Jul. 11, 2005 | (JP) | 2005-202151 |
| Jul. 11, 2005 | (JP) | 2005-202152 |
| Jun. 7, 2006 | (JP) | 2006-158706 |
| Jun. 7, 2006 | (JP) | 2006-158707 |

(51) Int. Cl.
*G06F 15/00* (2006.01)
*G06K 1/00* (2006.01)

(52) U.S. Cl. ............... 358/1.15; 358/1.13; 358/1.9

(58) Field of Classification Search ............ 358/1.1, 358/1.9, 1.11–1.18
See application file for complete search history.

(56) References Cited

U.S. PATENT DOCUMENTS

| 2003/0215256 | A1* | 11/2003 | Osada | 399/81 |
| 2005/0005200 | A1* | 1/2005 | Matena et al. | 714/38 |
| 2005/0226641 | A1* | 10/2005 | Ando et al. | 399/8 |
| 2006/0082801 | A1* | 4/2006 | Ohishi | 358/1.13 |

FOREIGN PATENT DOCUMENTS

| JP | 2001-92664 | 4/2001 |
| JP | 2002-84383 | 3/2002 |
| JP | 2004-185594 | 7/2004 |
| JP | 2004-312711 | 11/2004 |
| JP | 2004-318459 | 11/2004 |

\* cited by examiner

*Primary Examiner* — Thierry Pham
(74) *Attorney, Agent, or Firm* — Oblon, Spivak, McClelland, Maier & Neustadt, L.L.P.

(57) ABSTRACT

An image forming apparatus has a plurality of application execution environments, and includes a control part in each of the application execution environments, configured to control an application executed in a corresponding application execution environment. The control part in an application execution environment controls an application executed in an other application execution environment via the control part of the other application execution environment.

10 Claims, 21 Drawing Sheets

IMAGE FORMING APPARATUS, INFORMATION PROCESSING APPARATUS, INFORMATION PROCESSING METHOD, INFORMATION PROCESSING PROGRAM AND STORAGE MEDIUM

BACKGROUND OF THE INVENTION

1. Field of the Invention

The present invention generally relates to image forming apparatuses, information processing apparatuses, information processing methods, information processing programs and storage media, and more particularly to an image forming apparatus such as a copying apparatus, a printer, a scanner, a facsimile apparatus, a composite apparatus and a multi-function peripheral, an information processing apparatus such as a personal computer, an information processing method, a computer-readable information processing program, and a computer-readable storage medium such as a Secure Digital (SD) memory card.

2. Description of the Related Art

Recently, composite apparatuses and multi-function peripherals, which have a copy function, a printer function, a scanner function and a facsimile function, have been reduced to practice and marketed. When the composite apparatus or the multi-function peripheral functions as a copying apparatus or a printer, images are printed on a printing medium such as paper. When the composite apparatus or the multi-function peripheral functions as a copying apparatus or a scanner, images are read from documents. In addition, when the composite apparatus or the multi-function peripheral functions as a facsimile apparatus, images are exchanged with another equipment via a telephone line.

The applicant is aware of a Japanese Laid-Open Patent Application No. 2002-84383.

Application programs (hereinafter simply referred to as an applications) that are implemented in the composite apparatuses or the multi-function peripherals were conventionally in C-language, but recently, there are composite apparatuses or multi-function peripherals that are implemented with applications in the Java (registered trademark) language. In addition, the applications in the Java language actually include various kinds of applications such as the Applet, Xlet, Servlet and JSP. For this reason, an application management mechanism, such as a platform, which manages these applications, is gradually becoming more and more complex. Because the complexity of the application management mechanism is undesirable both from the point of view of the equipment performance and from the point of view of the development efficiency, it is desirable to form the application management mechanism in an integrated or unified manner as much as possible.

SUMMARY OF THE INVENTION

Accordingly, it is a general object of the present invention to provide a novel and useful image forming apparatus, information processing apparatus, information processing method, computer-readable information processing program and computer-readable storage medium, in which the problems described above are suppressed.

Another and more specific object of the present invention is to provide an image forming apparatus, an information processing apparatus, an information processing method, a computer-readable information processing program and a computer-readable storage medium, which can form an application management mechanism, which is configured to manage applications that are implemented in an image forming apparatus, in an integrated or unified manner.

Still another object of the present invention is to provide an image forming apparatus having a plurality of application execution environments, comprising a control part in each of the application execution environments, configured to control an application executed in a corresponding application execution environment, wherein the control part in a first application execution environment controls an application executed in an other application execution environment via the control part of the other application execution environment.

A further object of the present invention is to provide an information processing apparatus that functions as an emulator of an image forming apparatus and has application execution environments, comprising a control part in each of the application execution environments, configured to control an application executed in a corresponding application execution environment, wherein the control part controls an application executed in an other application execution environment of the information processing apparatus via the control part of the other application execution environment or, controls an application executed in an application execution environment of the image forming apparatus via the control part of the application execution environment of the image forming apparatus.

Another object of the present invention is to provide an information processing method executed in an image forming apparatus having a plurality of application execution environments, comprising a first control procedure of a first application execution environment controlling an application executed in the first application execution environment; a second control procedure of a second application execution environment controlling an application executed in the second application execution environment, wherein the first control procedure controls the application executed in the second application execution environment via the second control procedure.

Still another object of the present invention is to provide an information processing method executed in an information processing apparatus that functions as an emulator of an image forming apparatus and has a plurality of application execution environments, comprising a first control procedure of an application execution environment controlling an application executed in the application execution environment; and a second control procedure of the application execution environment controlling an application executed in an other application execution environment of the information processing apparatus via the other application execution environment or, controlling an application executed in an application execution environment of the image forming apparatus via the application execution environment of the image forming apparatus.

Still another object of the present invention is to provide an image forming apparatus comprising a bundle control part configured to control a first application that is implemented as a bundle; and a control intermediating part configured to provide with respect to the bundle control part an interface identical to that of the first application, and to intermediate control of a second application that is not implemented as a bundle in response to a calling of the interface by the bundle control part.

A further object of the present invention is to provide an information processing apparatus that functions as an emulator of an image forming apparatus, comprising a bundle control part configured to control a first application that is implemented as a bundle; and a control intermediating part configured to provide with respect to the bundle control part an interface identical to that of the first application, and to intermediate control of a second application that is not implemented as a bundle in response to a calling of the interface by the bundle control part.

Another object of the present invention is to provide an information processing method executed by an image forming apparatus that comprises a bundle control part configured to control a first application that is implemented as a bundle, comprising providing, by a control intermediating part, an interface identical to that of the first application with respect to the bundle control part; and intermediating control of a second application that is not implemented as a bundle in response to a calling of the interface by the bundle control part.

Still another object of the present invention is to provide an information processing method executed by an information processing apparatus that functions as an emulator of an image forming apparatus and has a bundle control part configured to control a first application that is implemented as a bundle, comprising providing with respect to the bundle control part an interface identical to that of the first application by a control intermediating part; and intermediating control of a second application that is not implemented as a bundle in response to a calling of the interface by the bundle control part.

A further object of the present invention is to provide a computer-readable information processing program for causing a computer to execute any one of the information processing methods described above.

Another object of the present invention is to provide a computer-readable storage medium which stores a program for causing a computer to execute any one of the information processing methods described above.

According to the present invention, it is possible to form an application management mechanism, which is configured to manage applications that are implemented in an image forming apparatus, in an integrated or unified manner.

Other objects and further features of the present invention will be apparent from the following detailed description when read in conjunction with the accompanying drawings.

DESCRIPTION OF THE PREFERRED EMBODIMENTS

Figure 1:
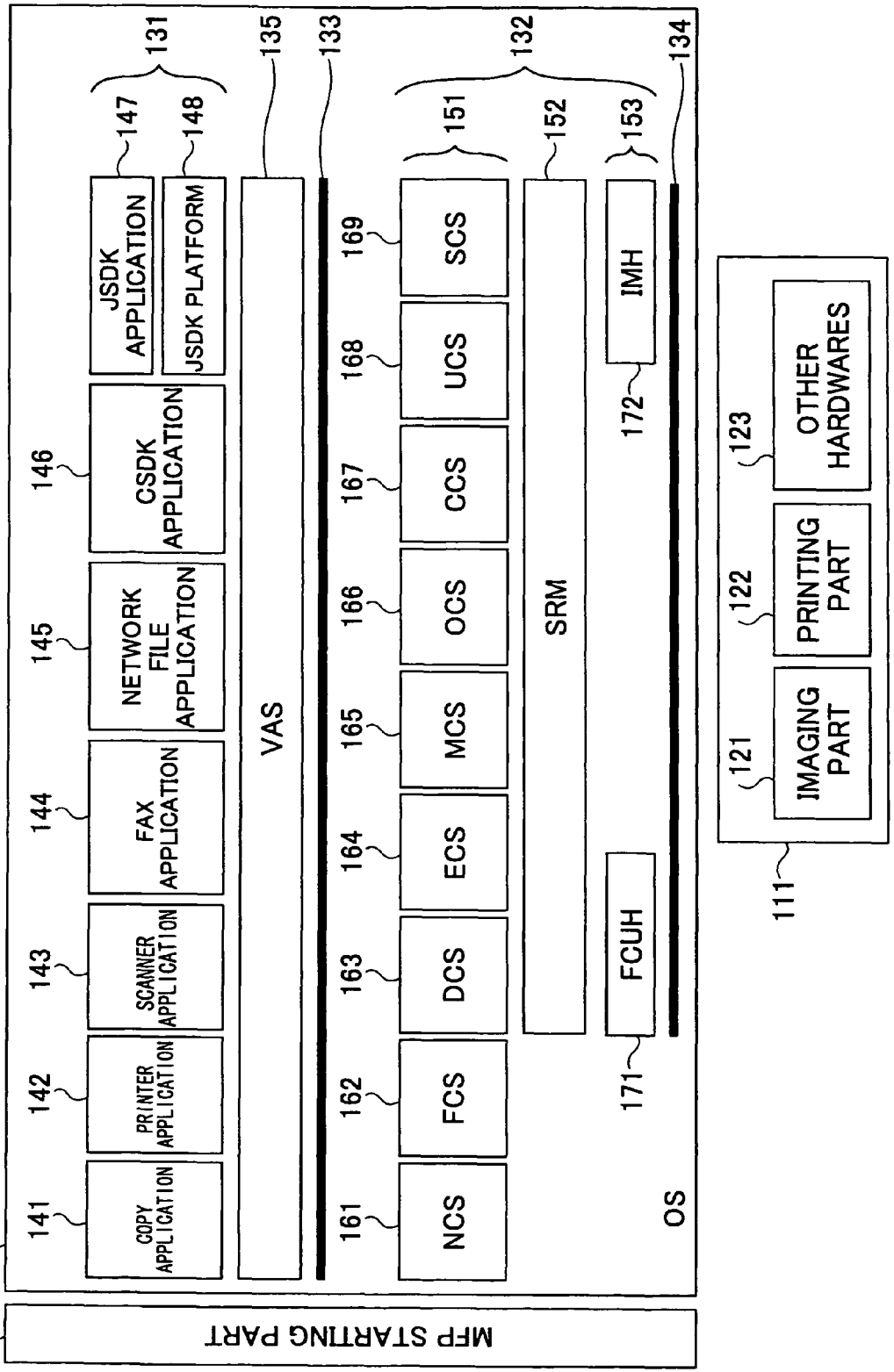
FIG. 1 is a diagram showing a multi-function peripheral corresponding to an embodiment of the present invention.

A description will be given of embodiments of embodiments of an image forming apparatus, an information processing apparatus, an information processing method, and information processing program and a storage medium according to the present invention, by referring to the drawings.

FIG. 1 is a diagram showing a Multi-Function Peripheral (MFP) 101 corresponding to an embodiment of the present invention. The MFP 101 shown in FIG. 1 has various hardwares 111, various softwares 112, and an MFP starting part 113.

The hardwares 111 of the MFP 101 include an imaging part (or an image pickup part) 121, a printing part 122, and other hardwares 123. The imaging part 121 is a hardware for reading images (image data) from documents. The printing part 122 is a hardware for printing images (image data) on printing media such as paper.

The softwares 112 of the MFP 101 include various applications (application programs) 131 and various platforms 132. The programs including the applications 131 and the platforms 132 are executed in parallel in units of processes by an Operating System (OS) such as UNIX (registered trademark).

The applications 131 include a copy application 141 for copying, a printer application 142 for printing, a scanner application 143 for scanning, a facsimile application 144 for facsimile communication, and a network file application 145 for network file.

The applications 131 may be developed using an exclusive Software Developing Kit (SDK). The application 131 that is developed using the SDK is referred to as an SDK application. The exclusive SDK may be a "CSDK" for developing the application 131 in the C-language or a "JSDK" for developing the application 131 in the Java (registered trademark) language. The application 131 that is developed using the CSDK is referred to as a "CSDK application", and the application 131 that is developed using the JSDK is referred to as a "JSDK application". The MFP 101 shown in FIG. 1 includes both a CSDK application 146 and a JSDK application 147. The MFP 101 further includes a JSDK platform 148 which is provided as the software 112 for intermediating between the JSDK application 147 that is described in the Java language and the other softwares 112. In other words, the MFP 101 has a plurality of execution environments including an execution environment for the CSDK application that is implemented in the C-language, an execution environment for the JSDK application that is implemented in the Java language and the like. The JSDK platform 148 is provided as a particular example of the execution environment for the JSDK application.

The platforms 132 include various control services 151, a system resource manager (SRM) 152, and various handlers 153. The control services 151 include a network control service (NCS) 161, a facsimile control service (FCS) 162, a delivery control service (DCS) 163, an engine control service (ECS) 164, a memory control service (MCS) 165, an operation panel control service (OCS) 166, a certification control service (CCS) 167, a user directory control service (UCS) 168, and a system control service (SCS) 169. The handlers 153 include a facsimile control unit handler (FCUH) 171 and an image memory handler (IMH) 172.

A process of the NCS 161 intermediates a network communication. A process of the FCS 162 provides an API of the facsimile. A process of the DCS 163 carries out a control related to a distribution process of stored documents. A process of the ECS 164 carries out a control related to the imaging part 121 and the printing part 122. A process of the MCS 165 carries out a control related to a memory and a hard disk drive (HDD). A process of the OCS 166 carries out a control related to an operation panel. A process of the CCS 167 carries out a control relate to an authentication process and an accounting process. A process of the UCS 168 carries out a control related to management of user information. A process of the SCS 169 carries out a control related to system management.

A virtual application service (VAS) 135 is provided as a software 112 for intermediating between the applications 131 and the platforms 132. The VAS 135 operates as a server process by regarding the application 131 as a client, and operates as a client process by regarding the platform 132 as a server. The VAS 135 has a rapping function for concealing the platforms 132 from the applications 131, and has a role of absorbing differences in versions of the platforms 132 when the versions of the platforms 132 are upgraded.

The MFP starting part 113 is first executed when the power is input to the MFP 101. Hence, the OS such as the UNIX is started, and the applications 131 and the platforms 132 are started. These programs are stored in the HDD or the memory card, and are read from the HDD or the memory card and started in the memory.

Figure 2:
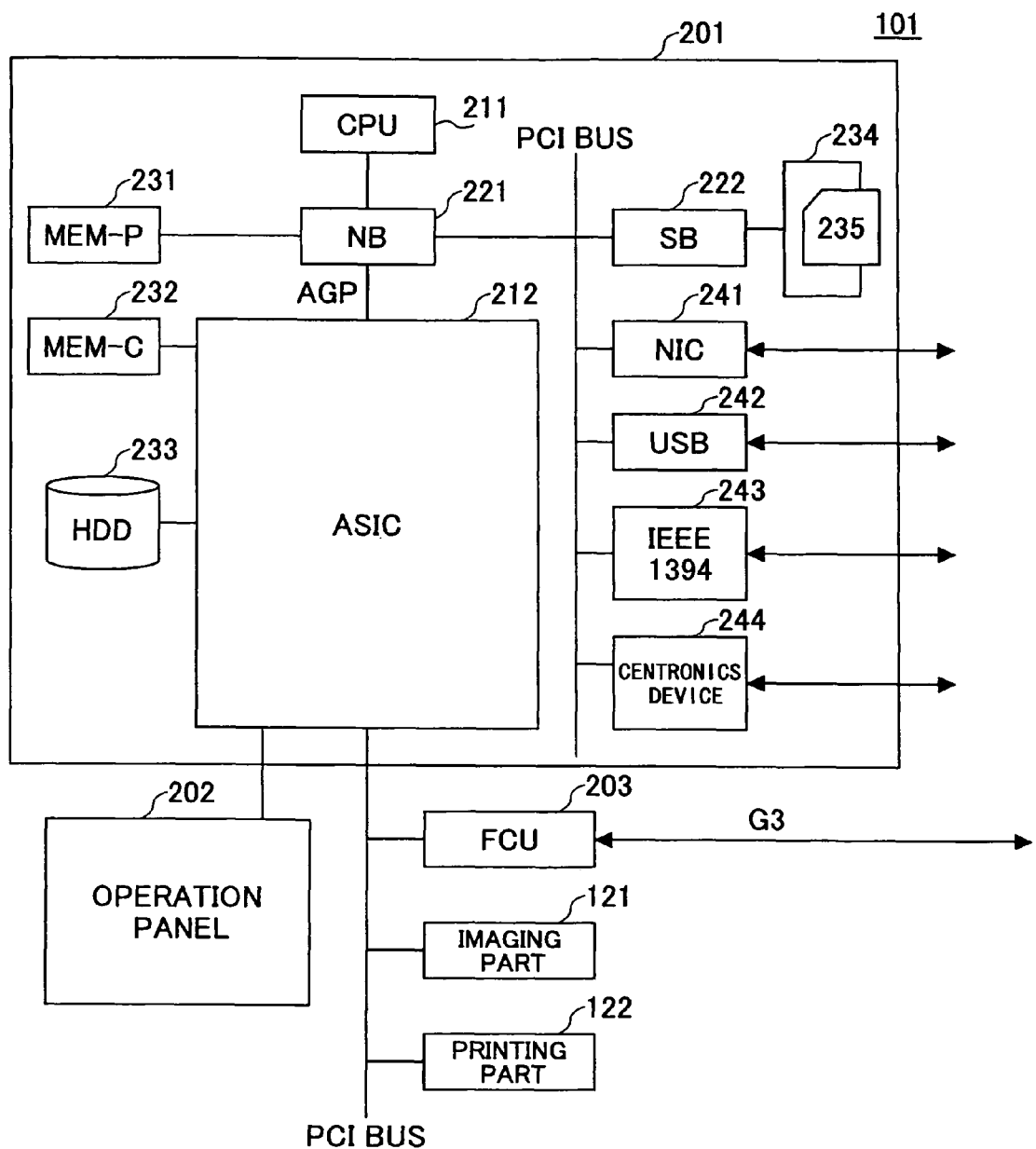
FIG. 2 is a diagram showing a hardware structure of the multi-function peripheral shown in FIG. 1.

FIG. 2 is a diagram showing a hardware structure of the MFP 101 shown in FIG. 1. The hardwares 111 of the MFP 101 include a controller 201, an operation panel 202, a facsimile control unit (FCU) 203, the imaging part 121 and the printing part 122.

The controller 201 has a CPU 211, an ASIC 212, an NB 221, an SB 222, a MEM-P 231, a MEM-C 232, a HDD 233, a memory card slot 234, a network interface controller (NIC) 241, an USB device 242, an IEEE1394 device 2443, and a Centronics device 244.

The CPU 211 is an integrated circuit (IC) for processing various information. The ASIC 212 is an IC for processing various images. The NB 221 is a north bridge for the controller 201. The SB 222 is a south bridge for the controller 201. The MEM-P 231 is a system memory of the MFP 101. The MEM-C 232 is a local memory of the MFP 101. The HDD 233 is a storage of the MFP 101. The memory card slot 234 is a slot for setting a memory card 235. The NIC 241 is a controller for network communication using a MAC address. The USB device 242 is a device that provides connection terminals in conformance with the USB standards. The IEEE1394 device 243 is a device that provides connection terminals in conformance with the IEEE1394 standards. The Centronics device 244 is a device that provides connection terminals in conformance with the Centronics specifications.

The operation panel 202 is a hardware (operation part) for use by an operator to make inputs to the MFP 101, and is also a hardware (display part) for use by the operator to obtain an output from the MFP 101.

Figure 3:
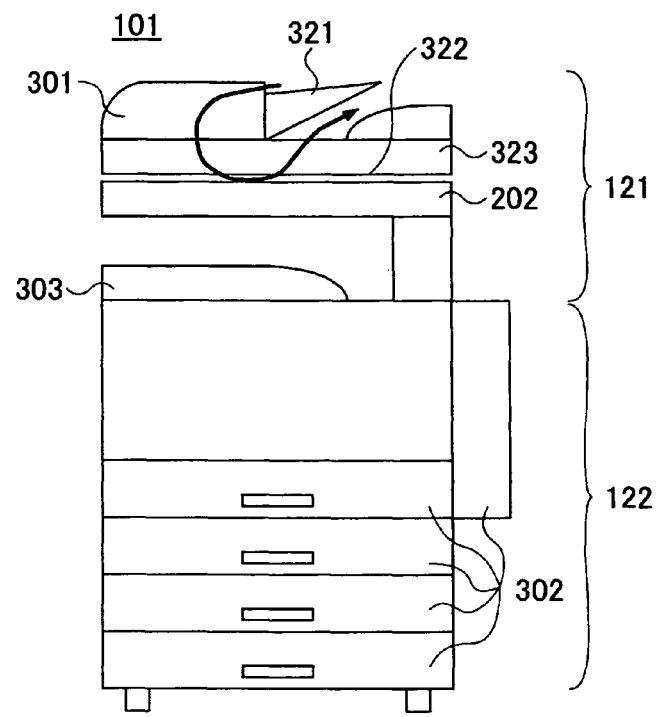
FIG. 3 is a diagram showing an external appearance of the multi-function peripheral shown in FIG. 1.

FIG. 3 is a diagram showing an external appearance of the MFP 101 shown in FIG. 1. FIG. 3 shows the position of the imaging part 121, the position of the printing part 122, and the position of the operation panel 202. FIG. 3 further shows a document setting part 301 on which the documents to be read are set, a paper supply part 302 from which the printing media such as paper are supplied, and a paper eject part 303 to which the printed media such as paper are ejected.

Figure 4:
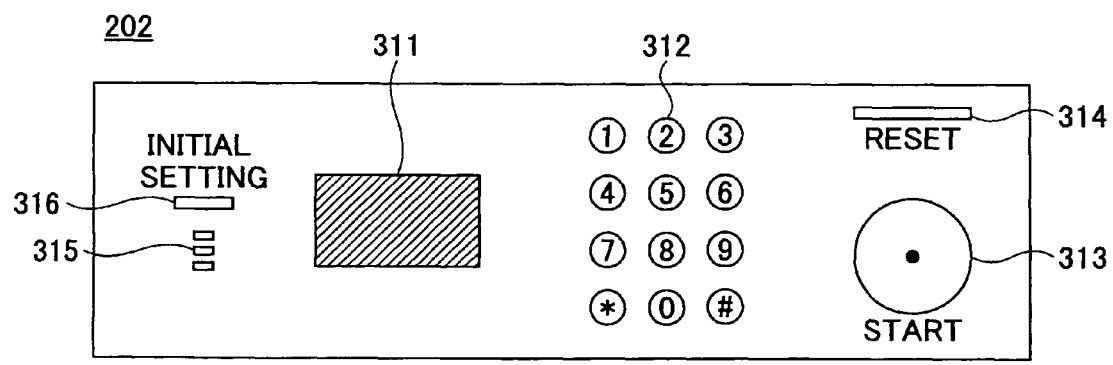
FIG. 4 is a diagram showing an operation panel.

As shown in FIG. 4 which is a diagram showing the operation panel 202, a touch panel 311, a ten-key 312, a start button 313, a reset button 314, function keys 315, and an initial setting button 316 are provided on the operation panel 202. The touch panel 311 is a hardware (touch operation part) for use by the operator to make inputs to the MFP 101 by a touch-operation, and is also a hardware (screen display part) for use by the operator to obtain an output from the MFP 101 by a screen display. The ten-key 312 is a hardware for use by the operator to input numbers to the MFP 101 by a key (or button) operation. The start button 313 is a hardware for use by the operator to make a start operation by a button operation. The reset button 314 is a hardware for use by the operator to make a reset operation by a button operation. The function keys 315 are hardwares for use by the operator to display operation screens by the CSDK application 146 and the JSDK application 147 by a key (or button) operation. The initial setting button 316 is a hardware for use by the operator to display an initial setting screen by a button operation.

The document setting part 301 is formed by an automatic document feeder (ADF) 321, a flat bed 322, and a flat bed cover 323. The paper supply part 302 is formed by four paper supply trays. The paper eject part 303 is formed on a single paper eject tray.

[CSDK and JSDK]

Figure 5:
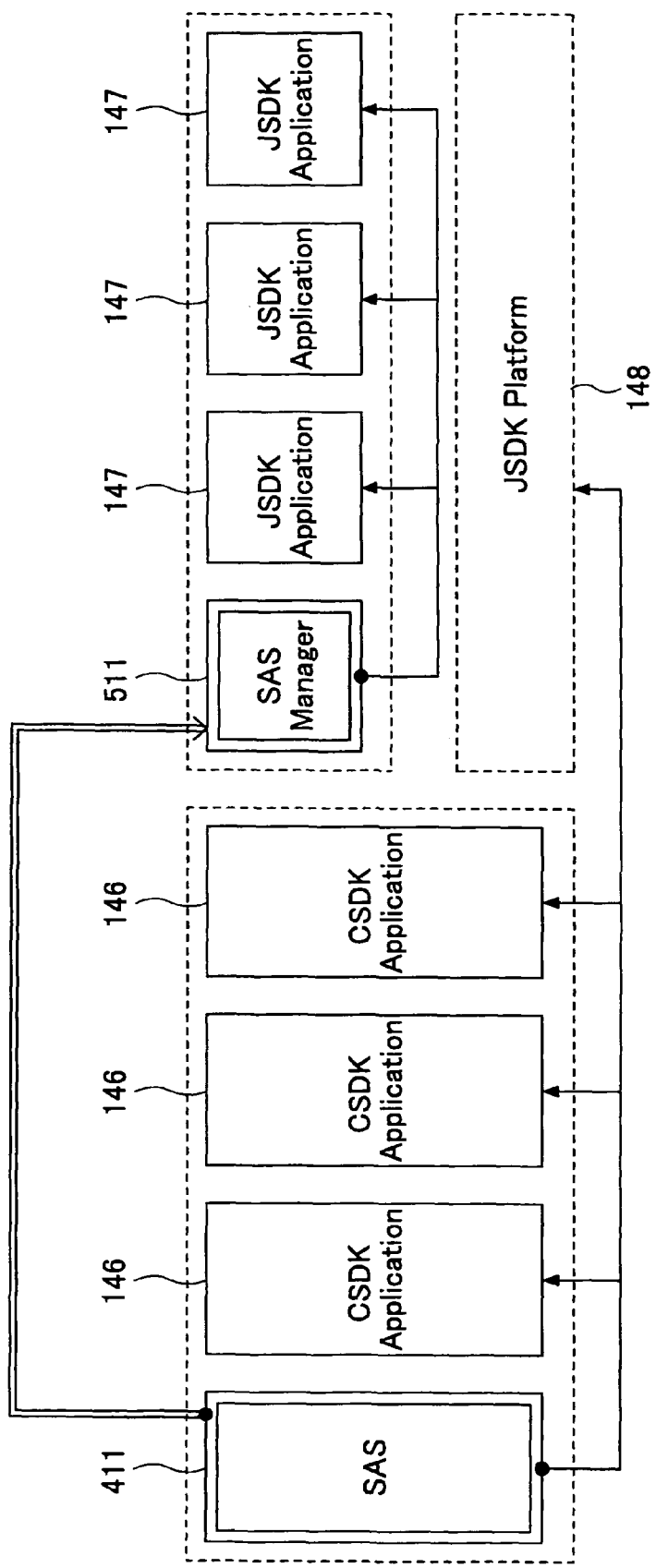
FIG. 5 is a diagram showing a first example of management mechanisms for CSDK applications and JSDK applications.

FIG. 5 is a diagram showing a first example of management mechanisms for the CSDK applications and the JSDK applications. The CSDK applications 146 are applications in the C-language, and the JSDK applications 147 are applications in the Java language. Each of the CSDK applications 146 and the JSDK applications 147 is executed as a thread.

In the MFP 101 shown in FIG. 1, an SDK application service (SAS) 411 exists as a CSDK application 146 for controlling the other CSDK applications 146, and an SDK application service manager (SAS manager) 511 exists as a JSDK application 147 for controlling the other JSDK applications 147. The SAS 411 and the SAS manager 511 carry out a starting control of the corresponding CSDK application 146 and JSDK application 147, a start cancelling (including stopping) control, an installing control, an uninstalling control, an updating control and the like. One of the reasons why the management mechanisms for the CSDK application 146 and the JSDK application 147 differ is because the developing languages used are different for the CSDK application 146 and the JSDK application 147. For example, when an attempt is made to directly control the JSDK application 147 by the SAS 411, it becomes necessary to call an interface in the Java language from source codes in the C-language, thereby requiring a high-level programming technique and processing contents that are troublesome and complex. In addition, even when the different execution formats of the CSDK application 146 and the JSDK application 147 are taken into consideration such as the execution of the CSDK application 146 as a process and the execution of the JSDK application 147 as a thread, it is more advantageous from the point of view of simplifying the management mechanism to provide separate application management mechanisms for the CSDK application 146 and for the JSDK application 147.

However, the SAS 411 can not only control the CSDK applications 146, but also control the JSDK applications 147 via the SAS manager 511. In other words, the SAS 411 can directly control the CSDK applications 146, and can also indirectly control the JSDK applications 147 via the SAS manager 511. Accordingly, the application management mechanism for the CSDK applications 146 and the application management mechanism for the JSDK applications 147 are formed in an integrated or unified manner by providing the SAS 411 with a function capable of controlling the SAS manager 511. Exchanges between the SAS 411 and the SAS manager 511 are made using a suitable protocol that may be simply used regardless of the developing language, such as the HyperText Transfer Protocol (HTTP) and the Simple Object Access Protocol (SOAP). As a result, it becomes unnecessary to call an interface in the Java language from the source code in the C-language, and the problem of the troublesome and complex processing contents can be solved. Moreover, the fact that the base portion of the software of the MFP 101 is in the C-language is also one of the reasons why the function of controlling the SDK applications is preferably concentrated in the SAS 411 which is also in the C-language.

Figure 6:
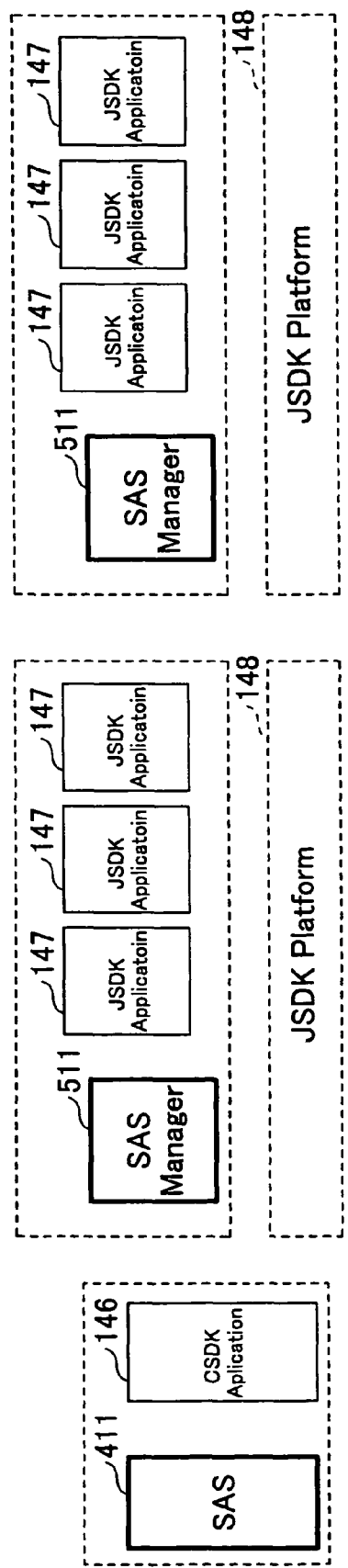
FIG. 6 is a diagram showing a second example of the management mechanisms for the CSDK applications and the JSDK applications.

FIG. 6 is a diagram showing a second example of the management mechanisms for the CSDK applications and the JSDK applications. In FIG. 6, those parts that are the same as those corresponding parts in FIG. 5 are designated by the same reference numerals, and a description thereof will be omitted. FIG. 6 shows a case where a plurality of JSDK platforms 148 are provided. In this case, the SAS manager 511 is provided for each of the JSDK platforms 148. Accordingly, the SAS 411 controls the JSDK applications 147 on the each JSDK platform 148 via the SAS manager 511 of each JSDK platform 148. In this case, the management mechanism for the SDK applications is also formed in the integrated and unified manner in the SAS 411.

Figure 7:
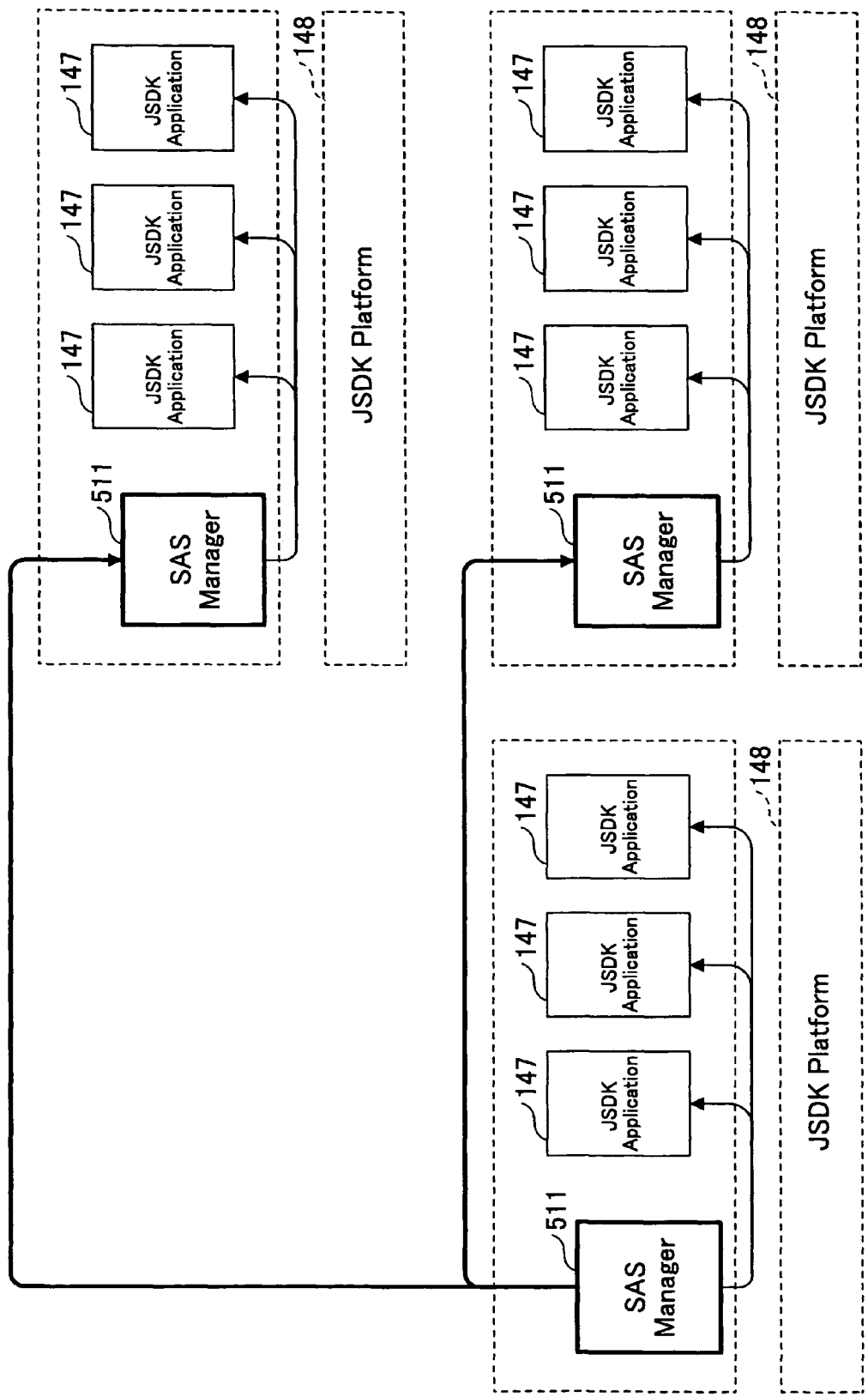
FIG. 7 is a diagram showing an example of a management mechanism for the JSDK applications in a case where no CSDK application exists.

FIG. 7 is a diagram showing an example of a management mechanism for the JSDK applications in a case where no CSDK application exists. In FIG. 7, those parts that are the same as those corresponding parts in FIGS. 5 and 6 are designated by the same reference numerals, and a description thereof will be omitted. FIG. 7 shows the management mechanism for managing the control of the JSDK applications on each platform in an integrated and unified manner, for the case where no CSDK application exists and a plurality of JSDK platforms 148 exist. In this case, the SAS manager 511 that operates on one of the plurality of JSDK platforms 148 simply needs to control the JSDK applications 147 on the other JSDK platforms 148 in the integrated and unified manner, via the SAS managers 511 on the other JSDK applications 148.

Figure 8:
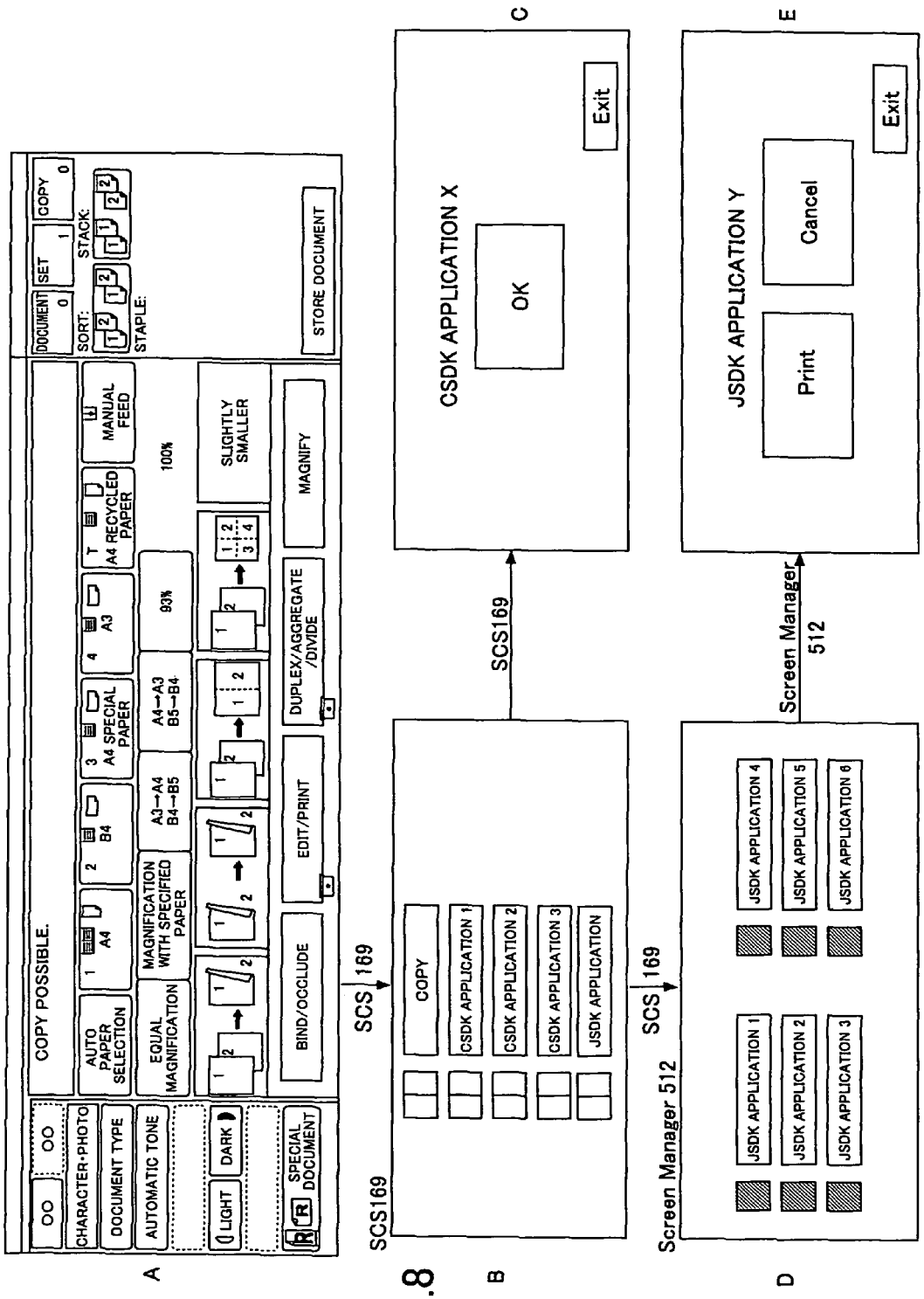
FIG. 8 is a screen transition diagram showing operation screens displayed on a touch panel.

FIG. 8 is a screen transition diagram showing operation screens displayed on the touch panel 311 shown in FIG. 4. In FIG. 8, when the function key 315 shown in FIG. 4 is pushed on an operation screen A, a transition is made to an operation screen B. The operation screen B is an operation screen which regards the CSDK applications 146 and the JSDK application 147 as operation targets. When one of the "CSDK applications 1, 2 and 3" is specified on the operation screen B, a transition is made to an operation screen C. The operation screen C is an operation screen of the specified CSDK application 146. On the other hand, when the "JSDK application" is specified on the operation screen B, a transition is made to an operation screen D. The operation screen D is an operation screen that regards the JSDK application 147, which is executed as a thread, as the operation target. A screen transition from the operation screen D to an operation screen E is carried out as a "switching" of the JSDK application 147 which occupies the display screen, only the JSDK application 147 that is being executed becomes a display target of the operation screen D, and the JSDK application 147 that is not being executed does not become the display target of the display screen D. When one the "JSDK applications 1, 2, 3, 4, 5 and 6" is specified on the operation screen D, a transition is made to the operation screen E. The operation screen E is an operation screen of the specified JSDK application 147.

The SCS 169 shown in FIG. 1 has the function of displaying the operation screen B shown in FIG. 8 and the function of making the screen transitions to the operation screens B, C and D shown in FIG. 8. A screen manager 512 shown in FIG. 11 which will be described later has the function of displaying the operation screen D shown in FIG. 8 and the function of making the screen transition to the operation screen E shown in FIG. 8. When making a certain CSDK application 146 or JSDK application 147 the display target of the operation screen B or D shown in FIG. 8, it is necessary to install the CSDK application 146 or JSDK application 147 beforehand by an installing operation on an installing operation screen. The CSDK application 146 or JSDK application 147 must also be started beforehand by a starting operation on a starting screen, if necessary. The SAS 414 and the SAS manager 511 carry out the installing control and the starting control of the CSDK application and JSDK application 147 in response to the installing operation on the installing operation screen and the starting operation on the starting screen. The SAS 414 and the SAS manager 511 similarly carry out the uninstalling control and the start cancelling control of the CSDK application 146 and the JSDK application 147.

[OSGi]

Figure 9:
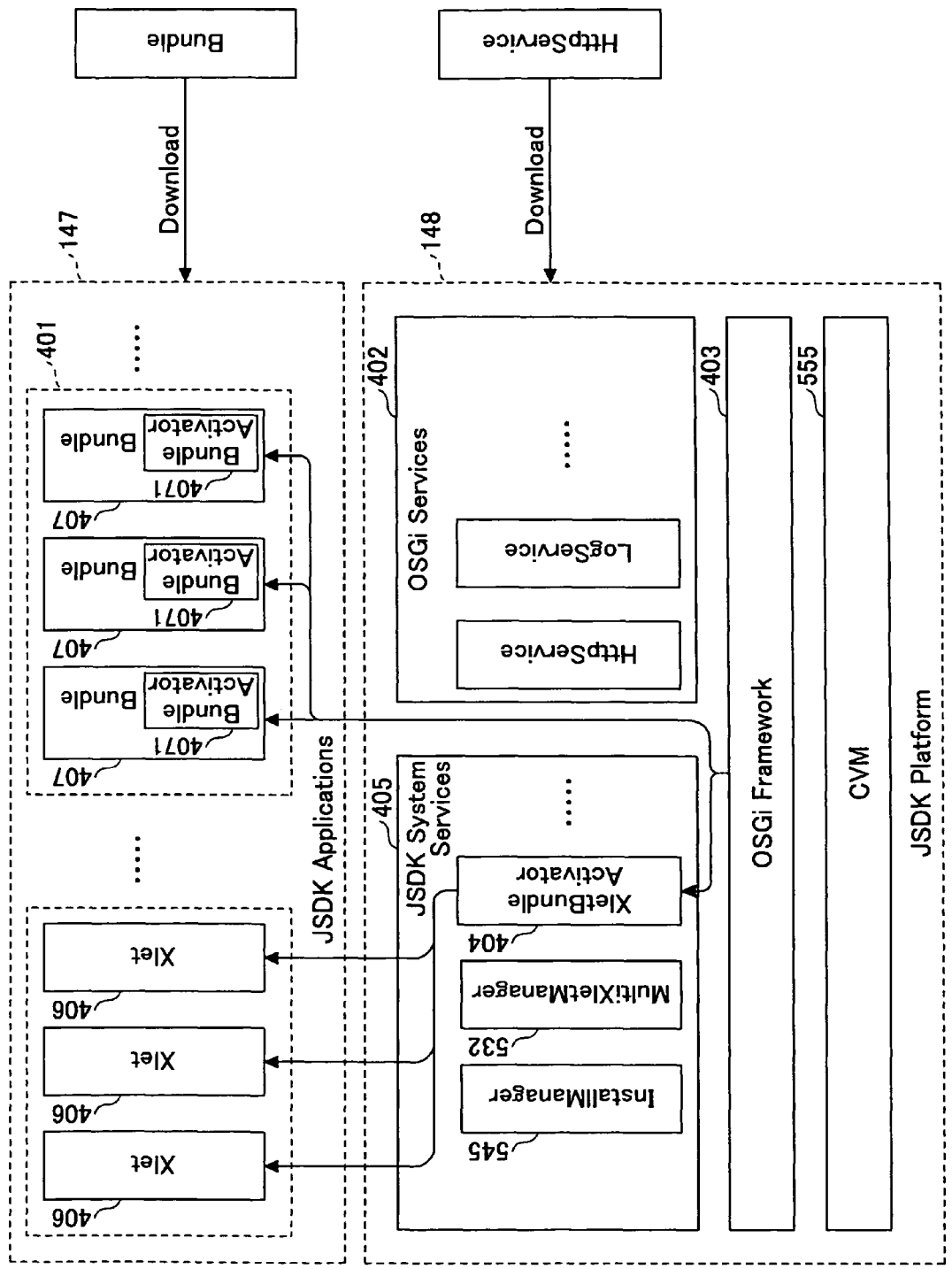
FIG. 9 is a diagram for explaining a JSDK platform and the JSDK application in more detail.

FIG. 9 is a diagram for explaining the JSDK platform and the JSDK application in more detail. The JSDK platform 148 of this embodiment is in conformance with the Open Service Gateway initiative (OSGi) service platform. The OSGi service platform is a standardized technique of the OSGi alliance, that is an open software component-forming technique based on the Java language. In an equipment implemented with the OSGi service platform, the software in the Java language is implemented in the form of a software component called a "bundle". The functions of such an equipment can be formed by the bundles, and the updating, customizing and maintenance of the functions of this equipment can be realized by downloading the bundles.

In FIG. 9, an OSGi framework 403 and OSGi services 402 are provided to make the JSDK platform 148 function as an OSGi platform. The OSGi framework 403 manages and controls the bundles, including management of data and life cycles of the bundles. The OSGi services 402 form a library group that provides various services with respect to the bundles.

Therefore, since the JSDK platform 148 functions as the OSGi service platform, the applications that operate on the JSDK platform 148, that is, the JSDK applications 147, can be implemented as bundles. FIG. 9 shows a state where a portion of the JSDK applications 147 is implemented as bundles 407. On the OSGi service platform, each bundle 407 is to be implemented with a bundle activator 4071. The bundle activator 4071 provides an interface with respect to the OSGi framework 403 for managing and controlling the bundles 407. In other words, the OSGi framework 403 manages and controls each bundle 407 by calling the bundle activator 4071 of each bundle 407. In this embodiment, the bundles 407 are generally referred to as OSGi applications 401.

In the MFP 101 of this embodiment, the applications other than the bundles are executable as the JSDK applications 147. In this embodiment, Xlets 406 are shown as examples of such applications that are other than the bundles and are executable as the JSDK applications 147. In the JSDK platform 148 shown in FIG. 9, JSDK system services 405 provide various services with respect to the Xlets 406. The JSDK system services 405 include classes such as an Xlet bundle activator 404, a multi Xlet manager 532 and an install manager 545.

The Xlet bundle activator 404 is a module for making the Xlets 406 appear as bundles with respect to the OSGi framework 403. The multi Xlet manager 532 manages the life cycle and the like of each Xlet 406. The install manager 545 manages the installing from an SD memory card and the Web and the uninstalling, with respect to the Xlets 406.

A CVM 555 shown in FIG. 9 is a virtual machine that realizes an execution environment of the Java.

A more detailed description will now be given on the Xlet bundle activator 404. Because the Xlets 406 are not implemented as bundles, the management and the like of the Xlets 406 cannot be made by the OSGi framework 403 as they are. But if separate management mechanisms were provided with respect to the applications that are implemented as the bundles 147 and the applications that are implemented as the Xlets 406 in the JSDK applications 147, the structure of the JSDK platform 148 would become complex. Hence, it is desirable that the management and the like of all of the JSDK applications 147 can be made centrally by the OSGi framework 403. The Xlet bundle activator 404 is provided so that the OSGi framework 403 can manage the Xlets 406 by an interface similar to that of the bundle 407. More particularly, the Xlet bundle activator 404 provides, with respect to the OSGi framework 403, an interface similar to the bundle activator 4071 that is implemented in each bundle 407. In response to a calling of a target interface by the OSGi framework 403, the Xlet bundle activator 404 calls an interface of the Xlet 406 corresponding to the target interface. In other words, the Xlet bundle activator 406 intermediates between the interface that is interpretable (or analyzable) by the OSGi framework 403 and the interface that is interpretable (or analyzable) by the Xlet 406, so as to intermediate the life cycle management and the like of the Xlet 406. Therefore, by the provision of the Xlet bundle activator 404, the OSGi framework 403 centrally manages the JSDK applications 147, regardless of whether the application is a bundle or an Xlet.

Figure 10:
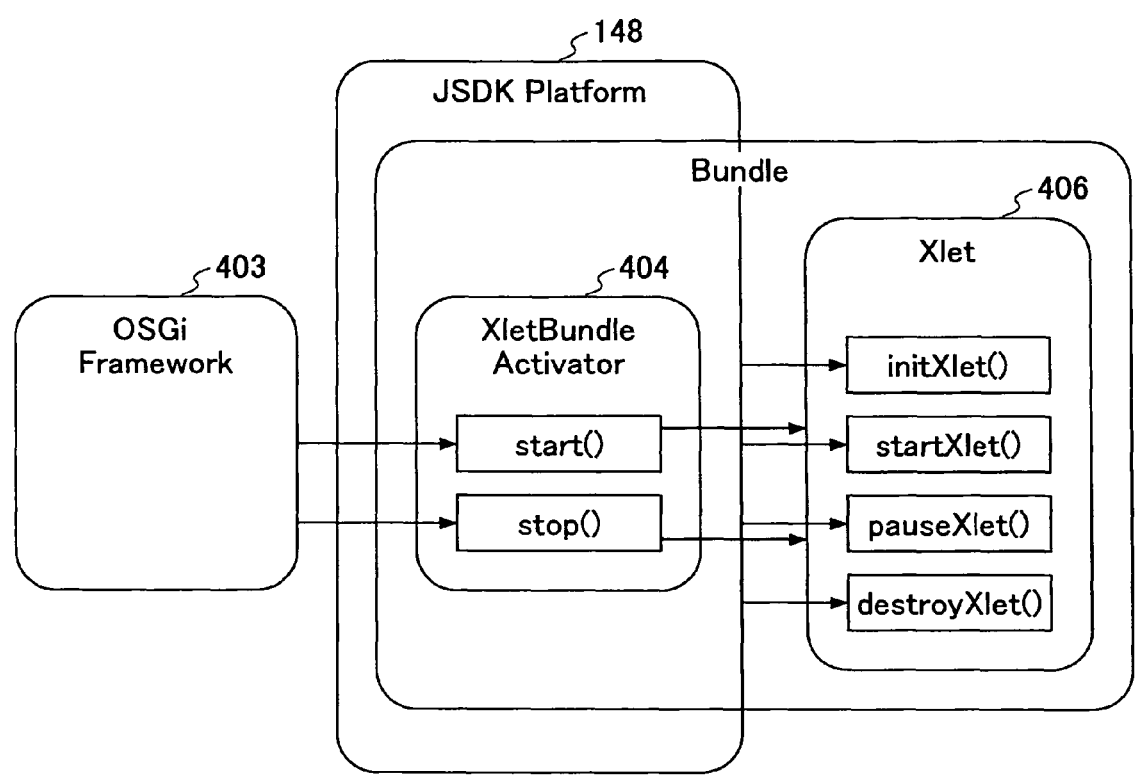
FIG. 10 is a diagram conceptually showing a bundlizing state of Xlets by an Xlet bundle activator.

FIG. 10 is a diagram conceptually showing a bundlizing state of Xlets by the Xlet bundle activator. The "bundlizing" refers to the forming of the Xlet 406 that is controllable by a control method similar to that for the bundle 407, when viewed from the OSGi framework 403.

In the OSGi service platform, the OSGi framework calls a start ( ) method that is implemented in the bundle activator of the bundle when starting this bundle. In addition, when cancelling the start of the bundle, the OSGi framework calls a stop ( ) method that is implemented in the bundle activator of this bundle.

On the other hand, initXlet ( ), startXlet ( ), pauseXlet ( ), destroyXlet ( ) and the like are implemented in the Xlet as methods for controlling the life cycle including the starting and start cancelling.

FIG. 10 shows a state where the differences of the interfaces are absorbed by the Xlet bundle activator 404. In other words, the OSGi framework 403 calls the start ( ) method or the stop ( ) method of the Xlet bundle activator 404, so as to request starting or start cancelling of the Xlet 406. The Xlet bundle activator 404 realizes the start or start cancelling of the Xlet 406, by calling the methods of the Xlet 406 such as the initXlet ( ), startXlet ( ), pauseXlet ( ) and destroyXlet ( ), in response to the calling of the start ( ) method or the stop ( ) method. Hence, the OSGi framework 403 can manage each of the JSDK applications 147 without having to be aware of whether the JSDK application 147 is implemented as the Xlet 406 or implemented as the bundle 407.

The structure in which the Xlet bundle activator 404 is implemented in the JSDK platform 148 is particularly convenient for a vendor of the JSDK applications 147. This is because, the JSDK application 147 that is implemented as the existing Xlet 406 can be operated on the OSGi framework 403 without having to modify the JSDK application 147 that is implemented as the existing Xlet 406, for example.

State transitions of the bundle and the Xlet differ, and the differences also appear in the differences of the respective interfaces. Accordingly, it may be said that the bundlizing of the Xlet is realized if the state transitions of the bundle and the Xlet match. Next, a description will be given of how the state transitions of the bundle and the Xlet are matched in this embodiment.

Figure 11:
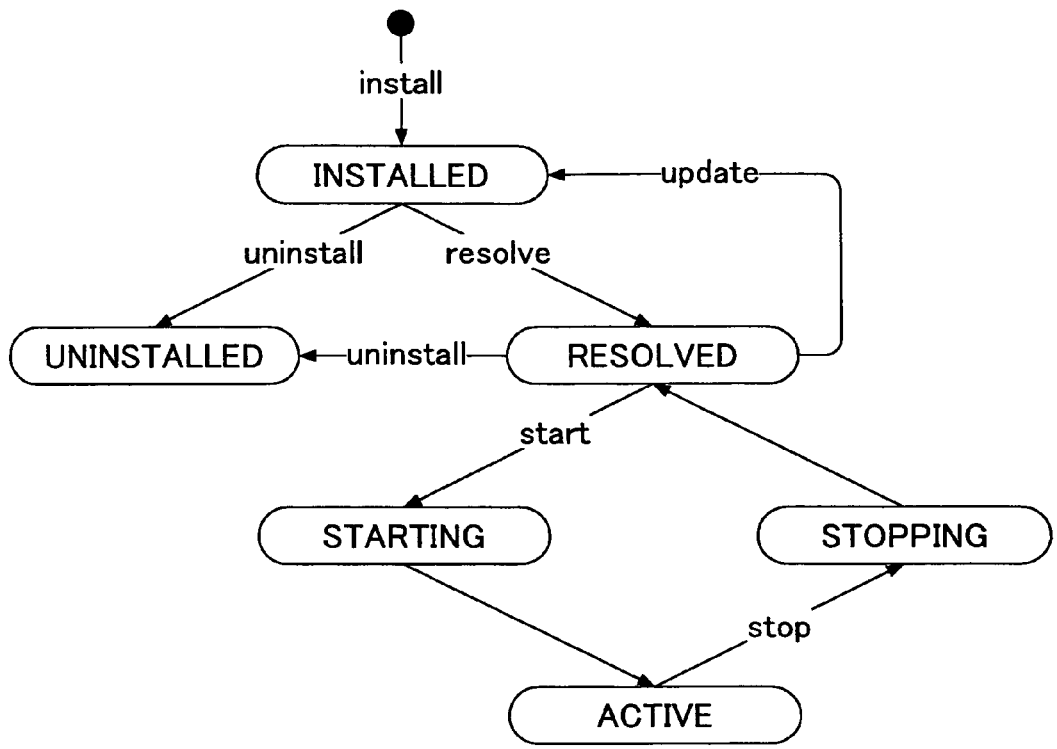
FIG. 11 is a state transition diagram of the bundle.

FIG. 11 is a state transition diagram of the bundle.

The states of the bundle include an installed state (INSTALLED), an uninstalled state (UNINSTALLED), an active state (ACTIVE), a resolved state (RESOLVED), a starting state (STARTING), a stopping state (STOPPING) and the like. The starting state refers to the state during the starting process, and the stopping state refers to the state during the start cancelling process. The state of the bundle undergoes a transition depending on the installing (install), uninstalling (uninstall), updating (update), starting (start), start cancelling or stopping (stop) and the like. The life cycle of the bundle is such a state transition of the bundle. The life cycle of the bundle is managed by the OSGi framework 403.

The installed state is a state immediately after the bundle is installed. The uninstalled state is a state immediately after the bundle is uninstalled. The active state is a state during which the bundle is started. The resolved state is a state during which the bundle is resolved, that is, the start cancelling is made. The stopping state is a state during which the starting process of the bundle is executed. The stopping state is a state during which the start cancelling process of the bundle is executed.

Figure 12:
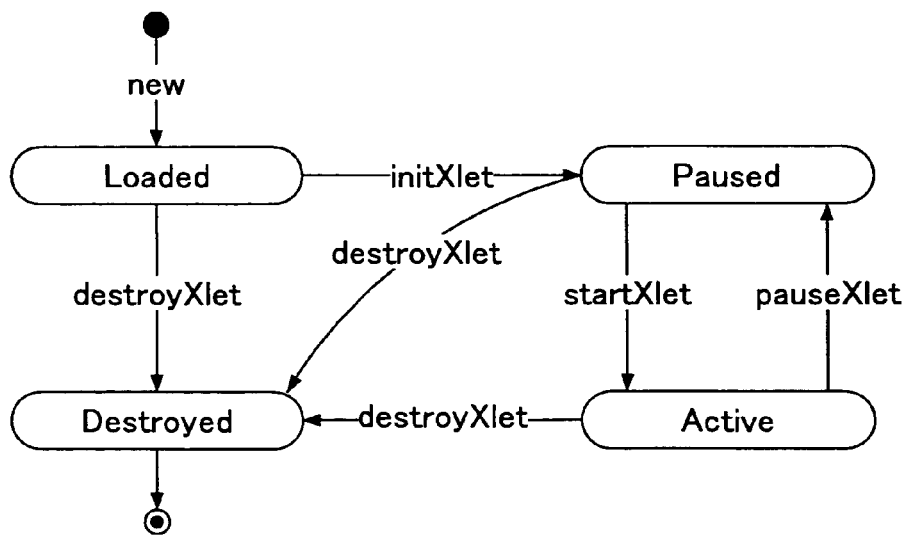
FIG. 12 is a state transition diagram of the Xlet.

FIG. 12 is a state transition diagram of the Xlet.

The states of the Xlet include a loaded (or initialized) state (Loaded), a paused state (Paused), an active state (Active), and a destroyed (or end) state (Destroyed). The state of the Xlet undergoes a transition depending on the starting (initXlet), starting (startXlet), pausing (pauseXlet) and destroying (destroyXlet). The life cycle of the Xlet is such a state transition of the Xlet. The life cycle of the Xlet, which is a JSDK application 147, is managed by the JSDK platform 148.

The loaded state is a state immediately after generation of an Xlet instance. The paused state is a state during which the service providing is stopped. The active state is a state during which the service is provided. The destroyed state is a state immediately after the Xlet instance is destroyed. A transition to the loaded state or the destroyed state can only be made once, and transitions can be made an arbitrary number of times between the paused state and the active state.

Figure 13:
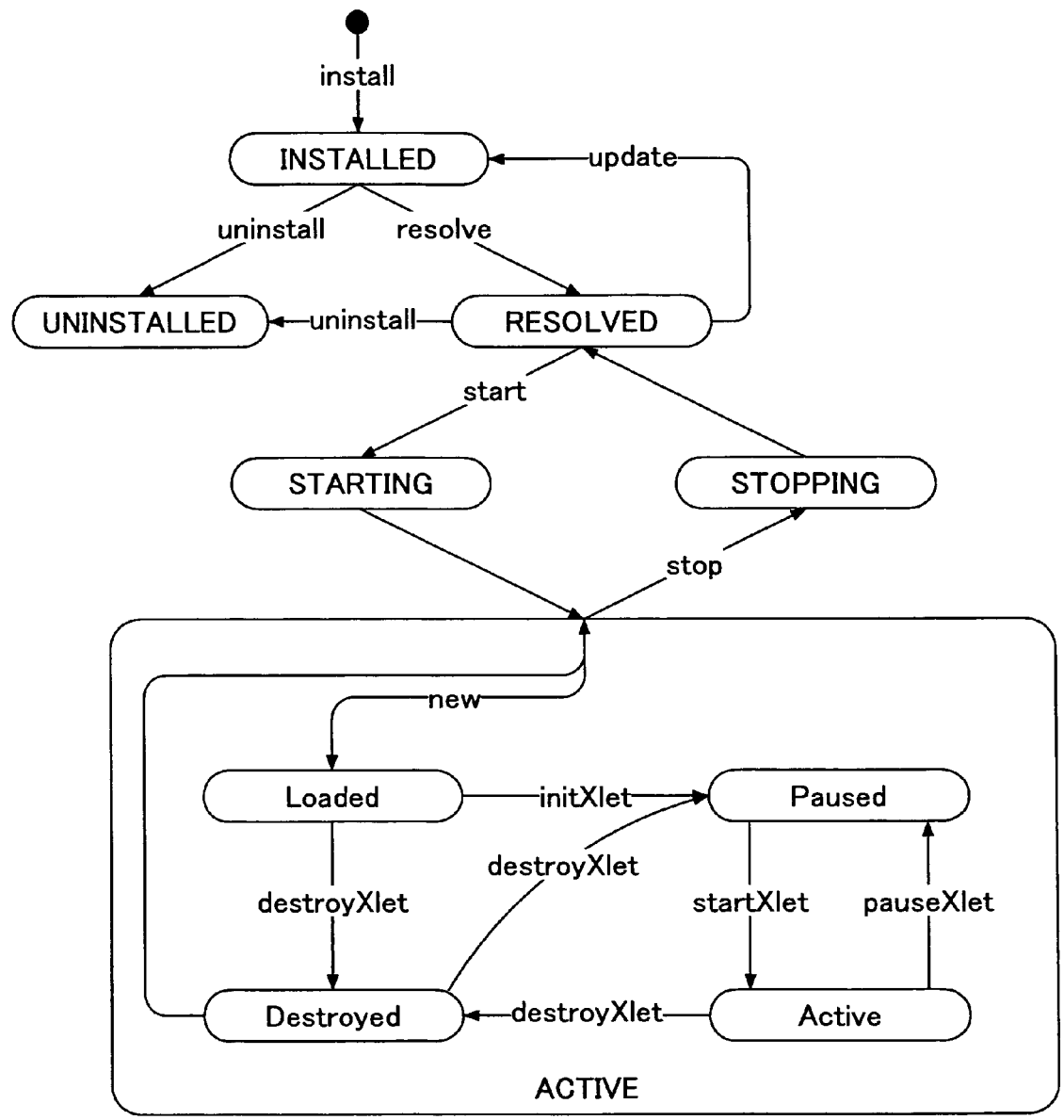
FIG. 13 is a state transition diagram of the Xlet that is bundlized and managed.

FIG. 13 is a state transition diagram of the Xlet that is bundlized and managed.

In a case where the Xlet is bundlized and managed, the loaded state, the paused state, the active state and the destroyed state of the Xlet belong to the active state of the bundle. In other words, the loaded state, the paused state, the active state and the destroyed state of the Xlet exist as the active state of the bundle. Therefore, by mapping the state transitions of the Xlet 406 to the state transitions of the bundle, the Xlet 406 realizes state transitions similar to those of the bundle 407 on the OSGi framework 403.

Next, a description will be given of how the installing and uninstalling processes and the starting and start cancelling processes of the Xlet 406 and the bundle 407 are matched on the OSGi framework 403, by referring to sequence diagrams.

Figure 14:
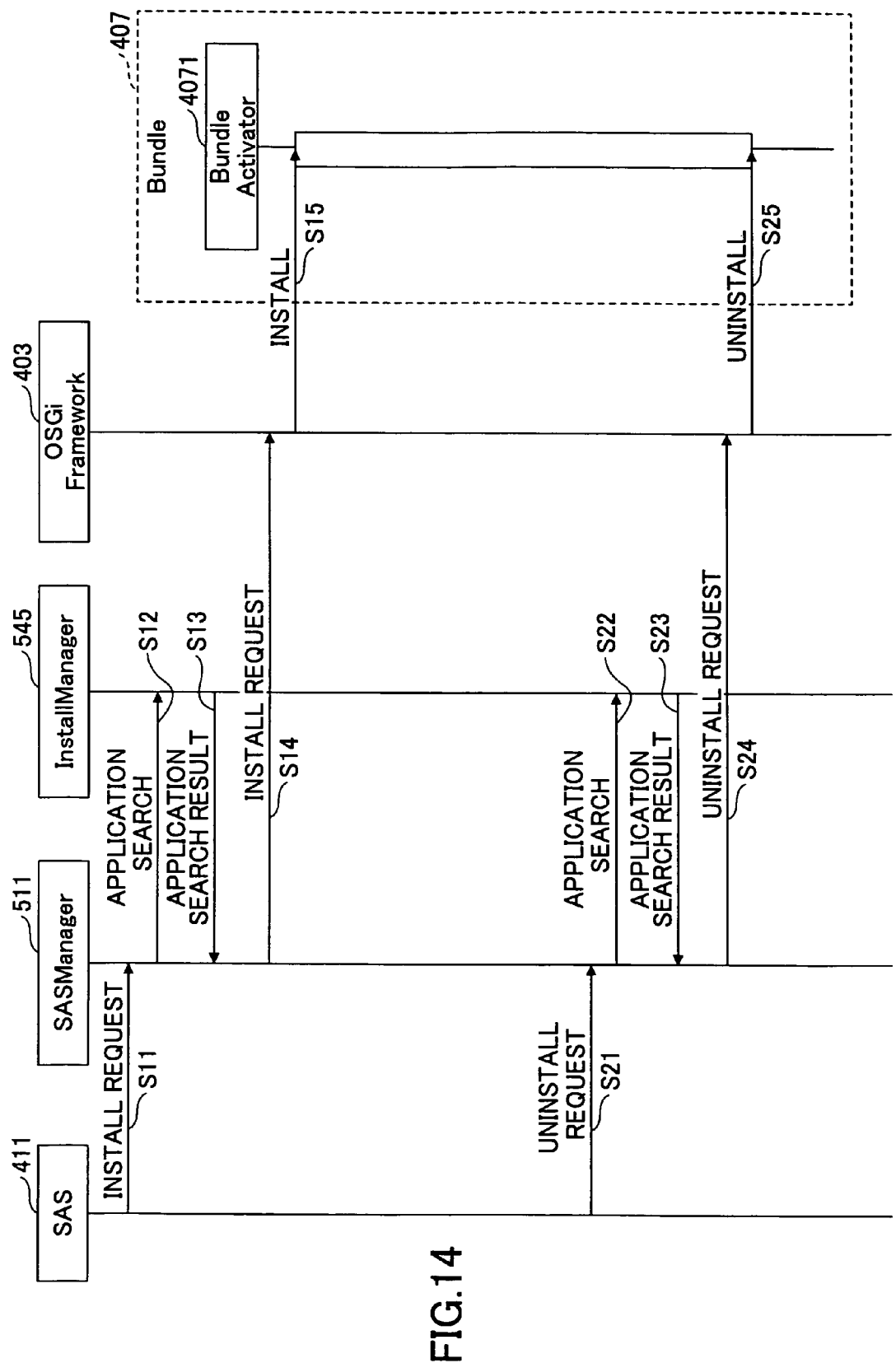
FIG. 14 is a sequence diagram for explaining an installing process and an uninstalling process for the bundle.

First, a description will be given of the installing and uninstalling processes. FIG. 14 is a sequence diagram for explaining the installing process and the uninstalling process for the bundle.

When the SAS 411 accepts an instruction from the user to install a JSDK application 147 via the operation screen that is displayed on the touch panel 311, the SAS 411 requests execution of the installing to the SAS manager 511 (step S11), since the installing of the JSDK application 147 is controlled by the SAS manager 511. The SAS manager 511 requests the install manager 545 to search for installable JSDK applications 147 from an installing source (for example, the Web site, the SD memory card or the like) that is selected on the operation screen (step S12). The install manager 545 searches for the installable JSDK applications 147, and returns a search result to the SAS manager 511 (step S13). The SAS manager 511 requests installing of a bundle 407 to the OSGi framework 403 if the JSDK application 147 that is selected by the user from a list of JSDK applications 147 acquired as the search result is implemented as the bundle 407 (step S14). The OSGi framework 403 requests installing of the bundle 407 which is the installing target, with respect to the bundle activator 4071 of the installing target bundle 407 (step S15). The bundle 407 is installed into the MFP 101 based on the request from the OSGi framework 403.

On the other hand, when the SAS 411 accepts an instruction from the user to uninstall a JSDK application 147 via the operation screen that is displayed on the touch panel 311, the SAS 411 requests execution of the uninstalling to the SAS manager 511 (step S21). The SAS manager 511 requests the install manager 545 to search for the JSDK applications 147 that are installed in the MFP 101 (step S22). The install manager 545 searches for the installed JSDK applications 147, and returns a search result to the SAS manager 511 (step S23). The SAS manager 511 requests uninstalling of a bundle 407 to the OSGi framework 403 if the JSDK application 147 that is selected by the user from a list of JSDK applications 147 acquired as the search result is implemented as the bundle 407 (step S24). The OSGi framework 403 requests uninstalling of the bundle 407 which is the uninstalling target, with respect to the bundle activator 4071 of the uninstalling target bundle 407 (step S25). The bundle 407 is uninstalled from the MFP 101 based on the request from the OSGi framework 403.

Figure 15:
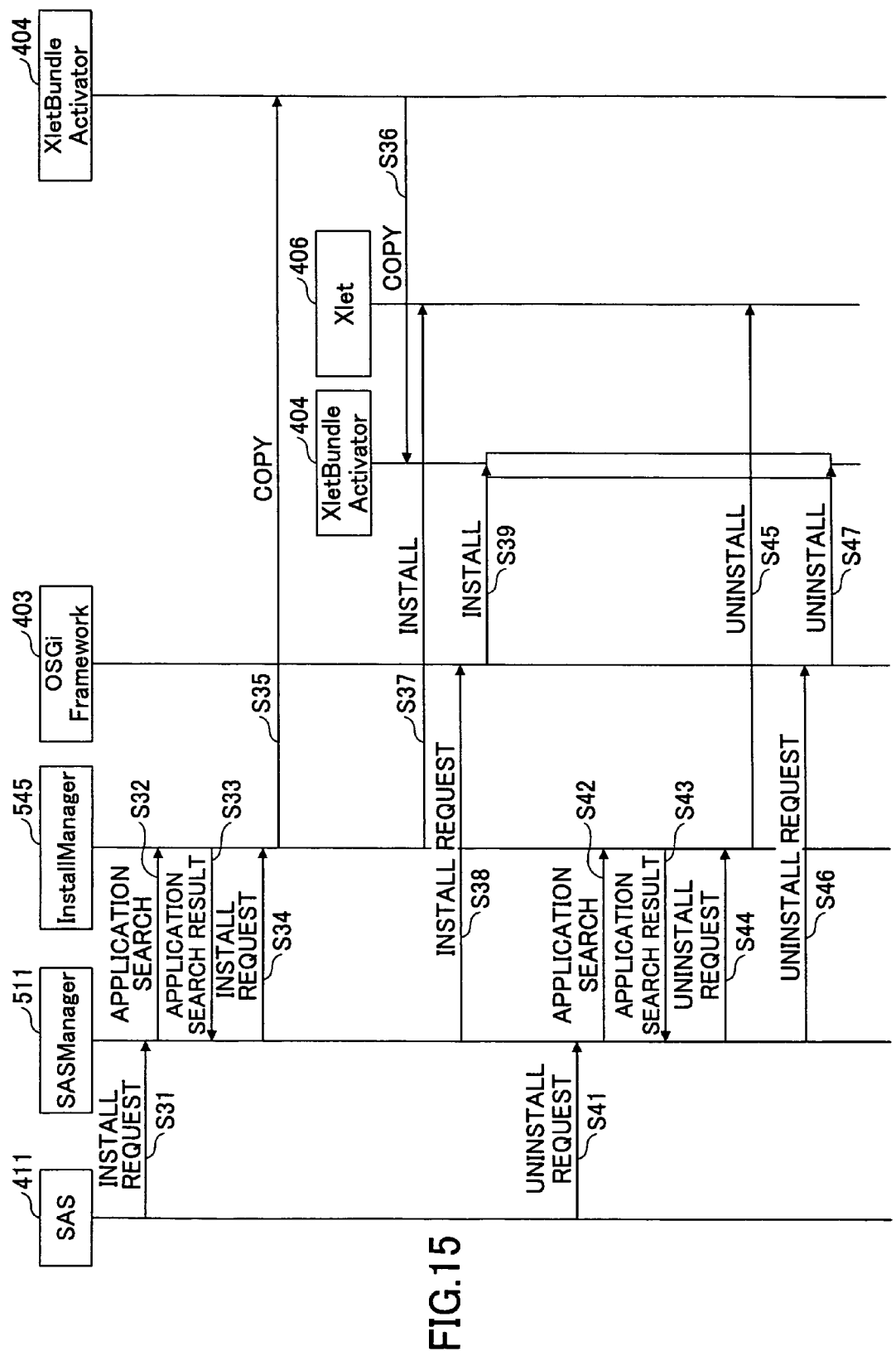
FIG. 15 is a sequence diagram for explaining the installing process and the uninstalling process for the bundlized Xlet.

FIG. 15 is a sequence diagram for explaining the installing process and the uninstalling process for the bundlized Xlet. In FIG. 15, steps S31 through S33 are the same as the steps S11 through S13 shown in FIG. 14, and a description thereof will be omitted.

The SAS manager 511 requests installing of an Xlet 406 to the install manager 545 if the JSDK application 147 that is selected by the user from a list of JSDK applications 147 acquired as the search result is implemented as the Xlet 406 (step S34). The install manager 545 copies a class file of the Xlet bundle activator 404 so as to generate an Xlet bundle activator 404 with respect to the Xlet 406 that is the installing target (steps S35 and S36). In other words, although the class file of the Xlet bundle activator 404 is required for each Xlet 406, the implementing contents thereof may be used in common, and thus, the Xlet bundle activator 404 with respect to the installing target Xlet 406 is generated by simply copying the class file that is prepared in advance. Next, the install manager 545 installs the Xlet 406 in the MFP 101 (step S37). When the Xlet 406 is installed in a normal manner, the SAS manager 511 requests installing of the bundlized Xlet 406 to the OSGi framework 403 (step S38). This calling by the SAS manager 511 corresponds to the step S14 shown in FIG. 14. In this case, it is of no concern to the OSGi framework 403 whether or not the installing target is the Xlet 406. Accordingly, the process executed by the OSGi framework 403 is similar to the case where the installing of the bundle 407 is requested. To the OSGi framework 403, the Xlet bundle activator 404 in this case appears similarly to the bundle activator 4071 shown in FIG. 14. Consequently, the OSGi framework 403 requests installing of the Xlet 406 to the Xlet bundle activator 404 (step S39). However, since the Xlet 406 is already installed, the Xlet bundle activator 404 and not the Xlet 406 is installed.

In FIG. 15, step S41 and the subsequent steps indicate the uninstalling process of the Xlet 406. In FIG. 15, steps S41 through S43 are the same as the steps S21 through S23 shown in FIG. 14, and a description thereof will be omitted. The SAS manager 511 requests uninstalling of an Xlet 406 to the install manager 545 if the JSDK application 147 that is selected by the user from a list of JSDK applications 147 acquired as the search result is implemented as the Xlet 406 (step S44). The install manager 545 uninstalls the Xlet 406 which is the uninstalling target (step S45). When the Xlet 406 is uninstalled in a normal manner, the SAS manager 511 requests uninstalling of the bundlized Xlet 406 to the OSGi framework 403 (step S46). This calling by the SAS manager 511 corresponds to the step S24 shown in FIG. 14. In this case, it is of no concern to the OSGi framework 403 whether or not the uninstalling target is the Xlet 406. Accordingly, the process executed by the OSGi framework 403 is similar to the case where the uninstalling of the bundle 407 is requested. To the OSGi framework 403, the Xlet bundle activator 404 in this case appears similarly to the bundle activator 4071 shown in FIG. 14. Consequently, the OSGi framework 403 requests uninstalling of the Xlet 406 to the Xlet bundle activator 404 (step S47). However, since the Xlet 406 is already uninstalled, the Xlet bundle activator 404 and not the Xlet 406 is uninstalled.

Therefore, in the MFP 101 of this embodiment, the installing and uninstalling processes of the bundle 407 and the installing and uninstalling processes of the Xlet 406 are carried out according to similar procedures, when viewed from the OSGi framework 403. In other words, the calling with respect to the OSGi framework 403 (steps S14 and S24) in FIG. 14 and the calling with respect to the OSGi framework 403 (steps S38 and S46) in FIG. 15 are appropriately matched. In addition, the calling with respect to the OSGi framework 403 (steps S15 and S25) in FIG. 14 and the calling with respect to the OSGi framework 403 (steps S39 and S47) in FIG. 15 are appropriately matched. Hence, it may be regarded that the OSGi framework 403 realizes the installing and uninstalling of the bundle 407 and the Xlet 406 without being concerned with the differences between the bundle 407 and the Xlet 406.

Figure 16:
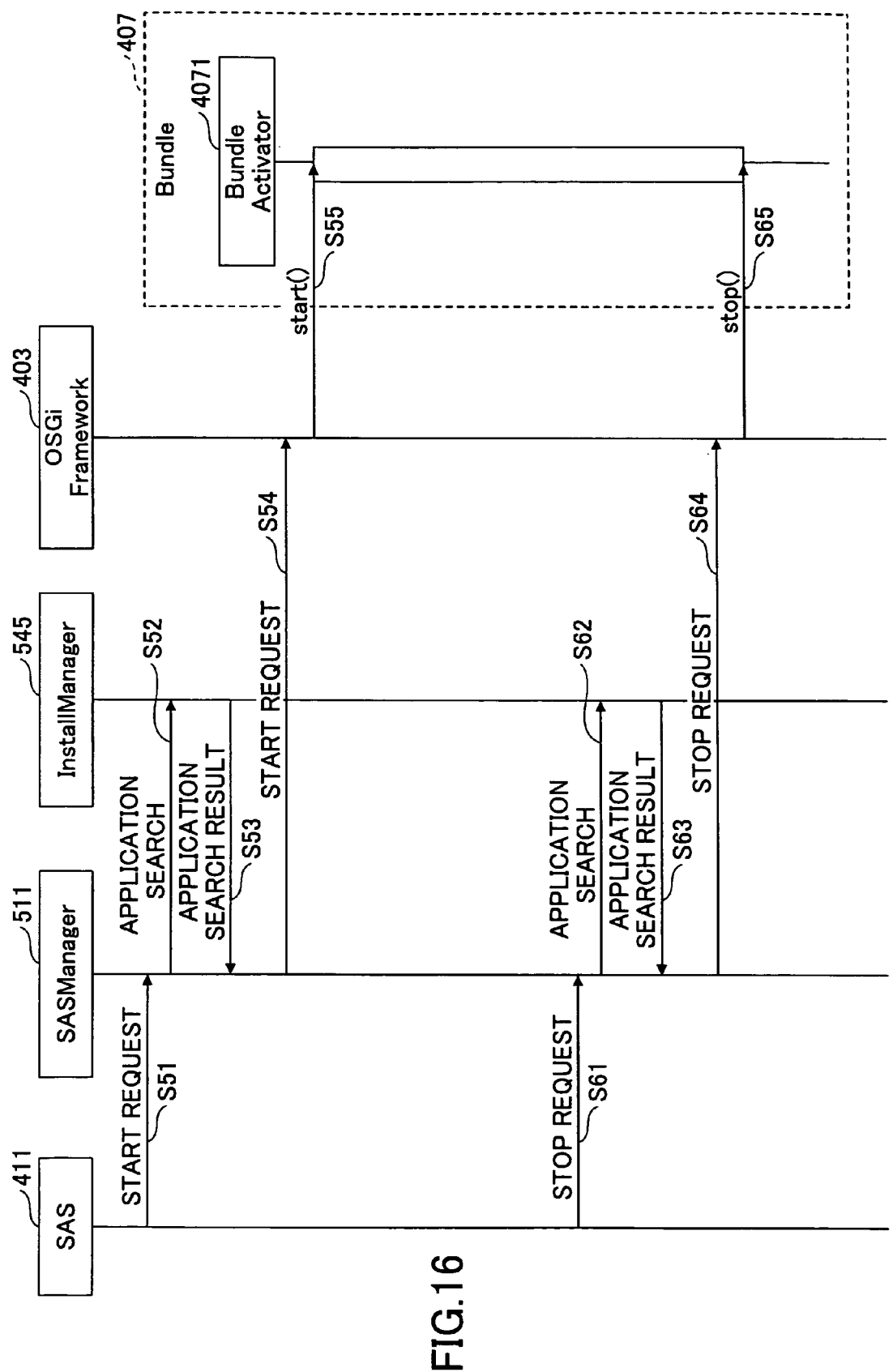
FIG. 16 is a sequence diagram for explaining a starting process and a start cancelling process for the bundle.

Next, a description will be given of the starting and start cancelling processes. FIG. 16 is a sequence diagram for explaining the starting process and the start cancelling process for the bundle.

When the SAS 411 accepts an instruction from the user to start a JSDK application 147 via the operation screen that is displayed on the touch panel 311, the SAS 411 requests execution of the starting to the SAS manager 511 (step S51), since the starting of the JSDK application 147 is controlled by the SAS manager 511. The SAS manager 511 requests the install manager 545 to search for the JSDK applications 147 that are installed in the MFP 101 (step S52). The install manager 545 searches for the installed JSDK application 147, and returns a search result to the SAS manager 511 (step S53). The SAS manager 511 requests, with respect to the OSGi framework 403, starting of a JSDK application 147 that is selected by the user from a list of JSDK applications 147 acquired as the search result (step S54). The OSGi framework 403 starts the bundle 407 which is the starting target by calling the start ( ) method of the bundle activator 4071 of the starting target bundle 407 (step S55).

On the other hand, when the SAS 411 accepts an instruction from the user to stop (make start cancelling) a JSDK application 147 via the operation screen that is displayed on the touch panel 311, the SAS 411 requests execution of the stop (start cancelling) to the SAS manager 511 (step S61). The SAS manager 511 requests the install manager 545 to search for the JSDK applications 147 that are installed in the MFP 101 (step S62). The install manager 545 searches for the installed JSDK applications 147, and returns a search result to the SAS manager 511 (step S63). With respect to the OSGi framework 403, the SAS manager 511 requests stopping (start cancelling) of the JSDK application 147 that is selected by the user from a list of JSDK applications 147 acquired as the search result (step S64). The OSGi framework 403 stops the bundle 407 which is the stopping target by calling the stop ( ) method of the bundle activator 4071 of the stopping target bundle 407 (step S65).

Figure 17:
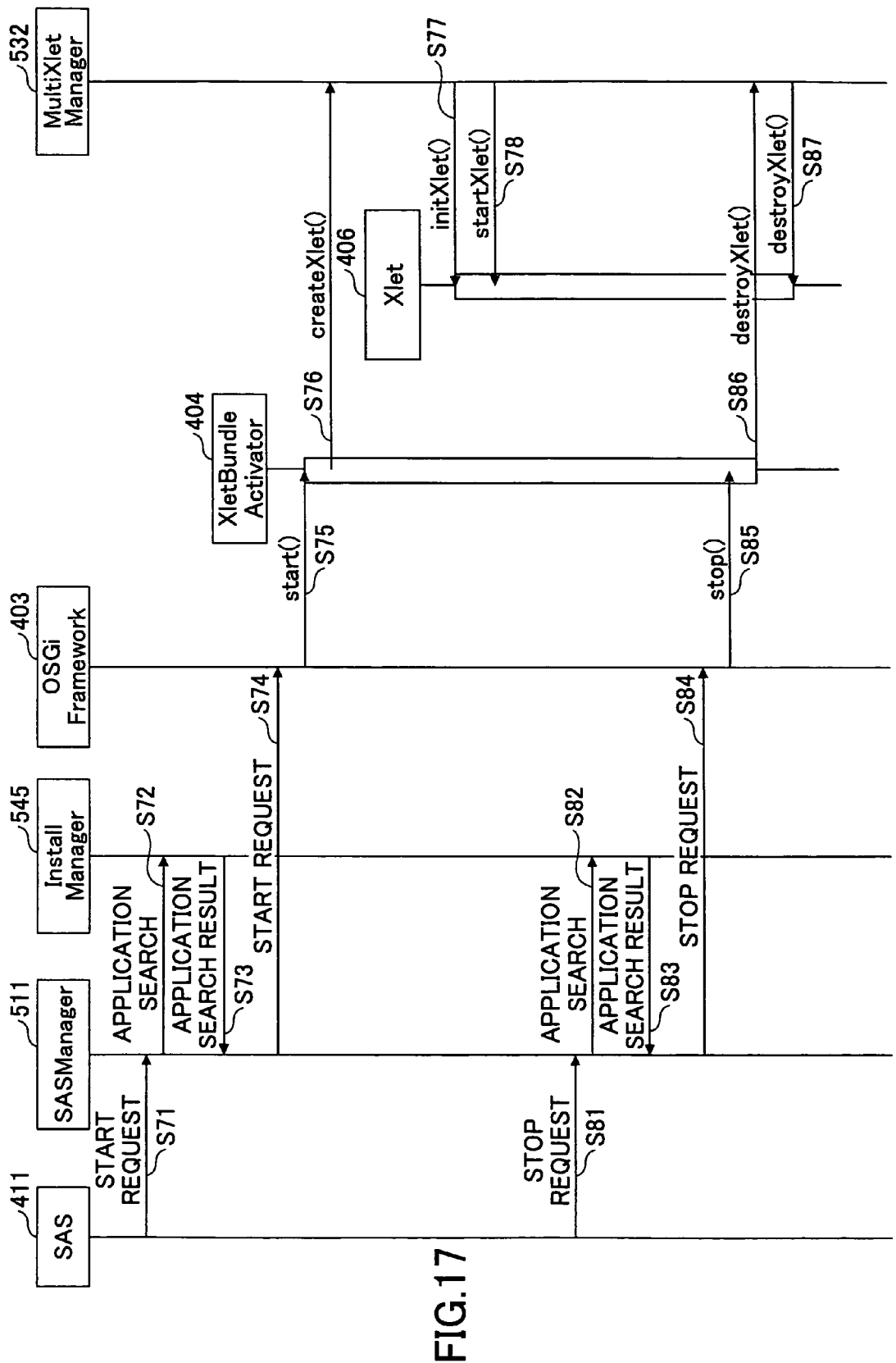
FIG. 17 is a sequence diagram for explaining the starting process and the start cancelling process for the bundlized Xlet.

FIG. 17 is a sequence diagram for explaining the starting process and the start cancelling process for the bundlized Xlet. In FIG. 17, steps S71 through S74 are the same as the step S51 through S54 shown in FIG. 16, and a description thereof will be omitted.

The OSGi framework 403 calls the start ( ) method of the Xlet bundle activator 404 corresponding to the Xlet 406 that is the starting target (step S75). But in this case, it is of no concern to the OSGi framework 403 whether or not the starting target is the Xlet 406. To the OSGi framework 403, the Xlet bundle activator 404 appears similarly to the bundle activator 401 shown in FIG. 16, and the OSGi framework 403 simply calls the start ( ) method of the Xlet bundle activator 404 similarly to the step S55 shown in FIG. 16 which calls the start ( ) method of the bundle activator 401. The Xlet bundle activator 404, whose start ( ) method is called, requests the starting (generation) of the Xlet 406 by calling the createXlet ( ) method of the multi Xlet manager 532 (step S76). The multi Xlet manager 532 initializes the Xlet 406 by calling the initXlet ( ) method of the Xlet 406 (step S77), and further, starts the Xlet 406 by calling the startXlet ( ) method (step S78).

In FIG. 17, step S81 and subsequent steps indicate a start cancelling process of the Xlet 406. In FIG. 17, steps S81 through S84 are the same as the steps S61 through S64 shown in FIG. 16, and a description thereof will be omitted. The OSGi framework 403 calls the stop ( ) method of the Xlet bundle activator 404 corresponding to the Xlet 406 that is the stopping target (step S85). But in this case, it is of no concern to the OSGi framework 403 whether or not the stopping target is the Xlet 406. The OSGi framework 403 simply calls the stop ( ) method of the Xlet bundle activator 404 similarly to the step S65 shown in FIG. 16 which calls the stop ( ) method of the bundle activator 401. The Xlet bundle activator 404, whose stop ( ) method is called, requests the stopping (destroying) of the Xlet 406 by calling the destroyXlet ( ) method of the multi Xlet manager 532 (step S86). The multi Xlet manager 532 stops the Xlet 406 by calling the destroyXlet ( ) method of the Xlet 406 (step S87).

Therefore, in the MFP 101 of this embodiment, the starting process and the start cancelling process of the bundle 407 and the starting process and the start cancelling process of the Xlet 406 are carried out according to similar procedures, when viewed from the OSGi framework 403. In other words, the calling with respect to the OSGi framework 403 (steps S54 and S64) in FIG. 16 and the calling with respect to the OSGi framework 403 (steps S74 and S84) in FIG. 17 are appropriately matched. In addition, the calling with respect to the OSGi framework 403 (steps S55 and S65) in FIG. 16 and the calling with respect to the OSGi framework 403 (steps S75 and S85) in FIG. 17 are appropriately matched. Hence, it may be regarded that the OSGi framework 403 realizes the starting and start cancelling (or stopping) of the bundle 407 and the Xlet 406 without being concerned with the differences between the bundle 407 and the Xlet 406.

Figure 18:
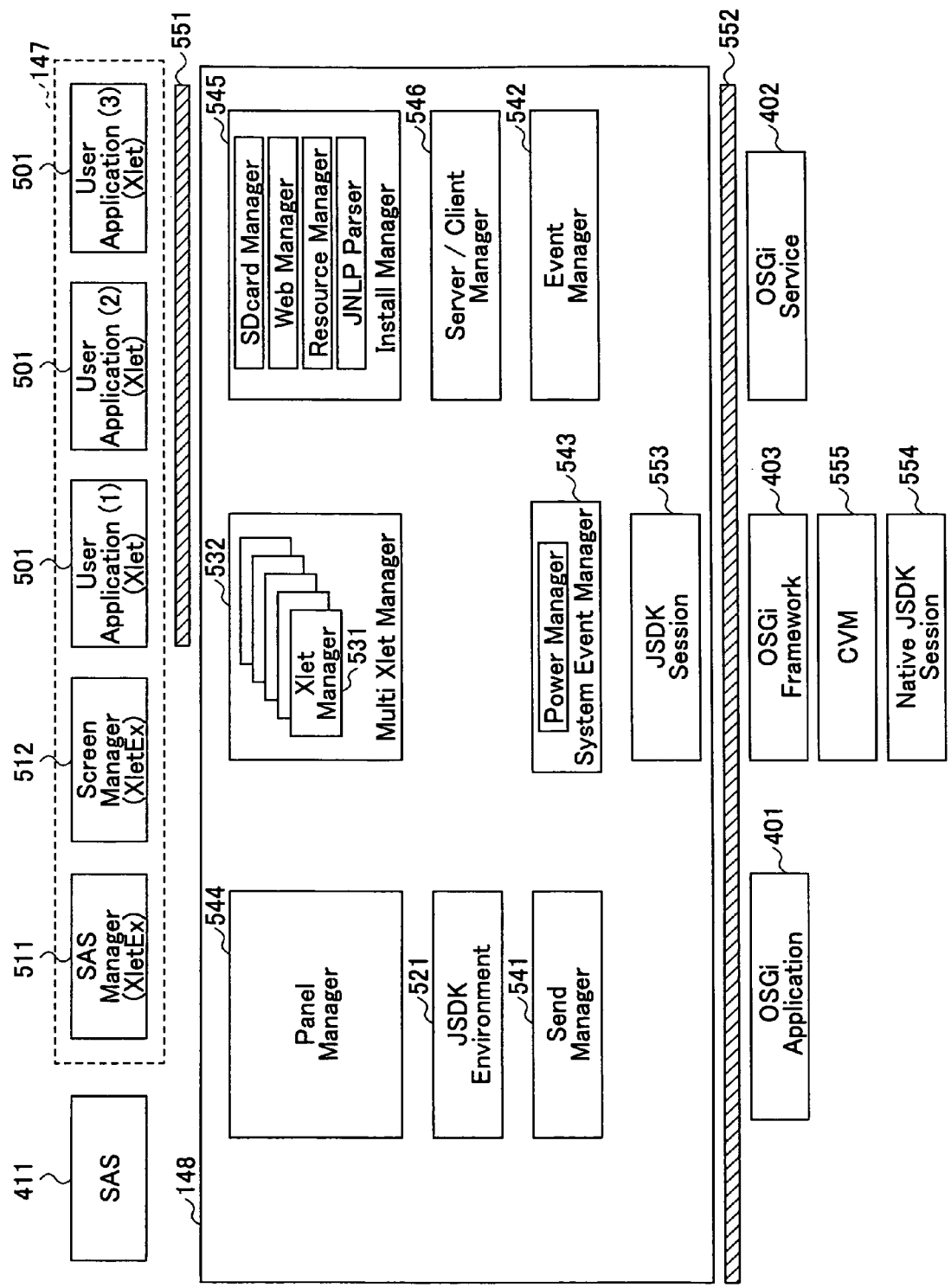
FIG. 18 is a class diagram of the JSDK applications and the JSDK platform shown in FIG. 1.

FIG. 18 is a class diagram of the JSDK applications 147 and the JSDK platform 148 shown in FIG. 1. The JSDK applications 147 and the JSDK platform 148 are executed as a single process as a whole, on the same process. Each of the blocks within the JSDK applications 147 and the JSDK platform 148 is executed in parallel in units of threads (multithread) as threads on a single process. The JSDK applications 147 and the JSDK platform 148 are translated in a batch from source codes into byte codes by a Java compiler, and successively executed by a Java virtual machine. The JSDK applications 147 and the JSDK platform 148 are based on the "Foundation Profile" of the "Java 2 Micro Edition".

[JSDK]

As shown in FIG. 18, user applications 501, the SAS manager 511, the screen manager 512 and the like exist as the JSDK applications 147.

The user application 501 is a JSDK application 147 that is developed by the user (for example, the vendor) of the MFP 101 using the JSDK. The SAS manager 511 is a JSDK application 147 that controls the other JSDK applications 147 such as the user applications 501. The screen manager 512 is a JSDK application 147 that displays operation screens having the other JSDK applications 147 such as the user applications 501 as the operation target.

In this case, the user application 501 is a kind of an Xlet which is a Java application, comparable to stand-alone applications and applets. The SAS manager 511 and the screen manager 512 are Xlets (XletEx) that have been subjected to peculiar extensions.

As shown in FIG. 18, the JSDK platform 148 includes classes such as a JSDK environment 521, an Xlet manager 531, the multi Xlet manager 532, a send manager 541, an event manager 542, a system event manager 543, a panel manager 544, the install manager 545 and a server/client manager 546.

The JSDK environment 521 is a class for executing a starting environment setting of the JSDK system that reflects the execution environment of the JSDK system.

The Xlet manager 531 is a class for carrying out a 1:1 management of the Xlet. In this particular case, the life cycles and data of five Xlets are managed on a 1:1 basis by the corresponding five Xlet managers 531. The multi Xlet manager 532 is a class for managing al of the Xlet managers 531. In this particular case, all of the life cycles and data of the five Xlet managers 531 are managed by the single multi Xlet manager 532. The life cycles and data of the "bundles" of the SAS manager 511, the screen manager 512, the JSDK environment 521, the multi Xlet manager 532, the send manager 541, the event manager 542, the system event manager 543, the panel manager 544, the install manager 545 and the server/client manager 546 are managed by the OSGi framework 403.

The system event manager 543 is a class for managing a system event from the platform 132 shown in FIG. 1, such as a power mode. The panel manager 544 is a class for making an arbitration when one Xlet occupies the screen of the operation panel 202. The install manager 545 is a class for managing the installing from the Web and the SD memory card and the uninstalling.

In the JSDK system shown in FIG. 18, a JSDK API 551 and a JSDK API 552 are used as APIs. One difference between the Xlet and the XletEx is that when accessing an object, the use of the JSDK API 551 and the access to the JSDK platform 148 is possible in the case of the XletEx. As elements related to the JSDK system shown in FIG. 18, the MFP 101 shown in FIG. 1 further includes a JSDK session 553 and a native JSDK session 554 which form an interface for the C-language and the Java language, and the CVM 555 which is a Java virtual machine for executing the JSDK applications 147 and the JSDK platform 148.

Figure 19:
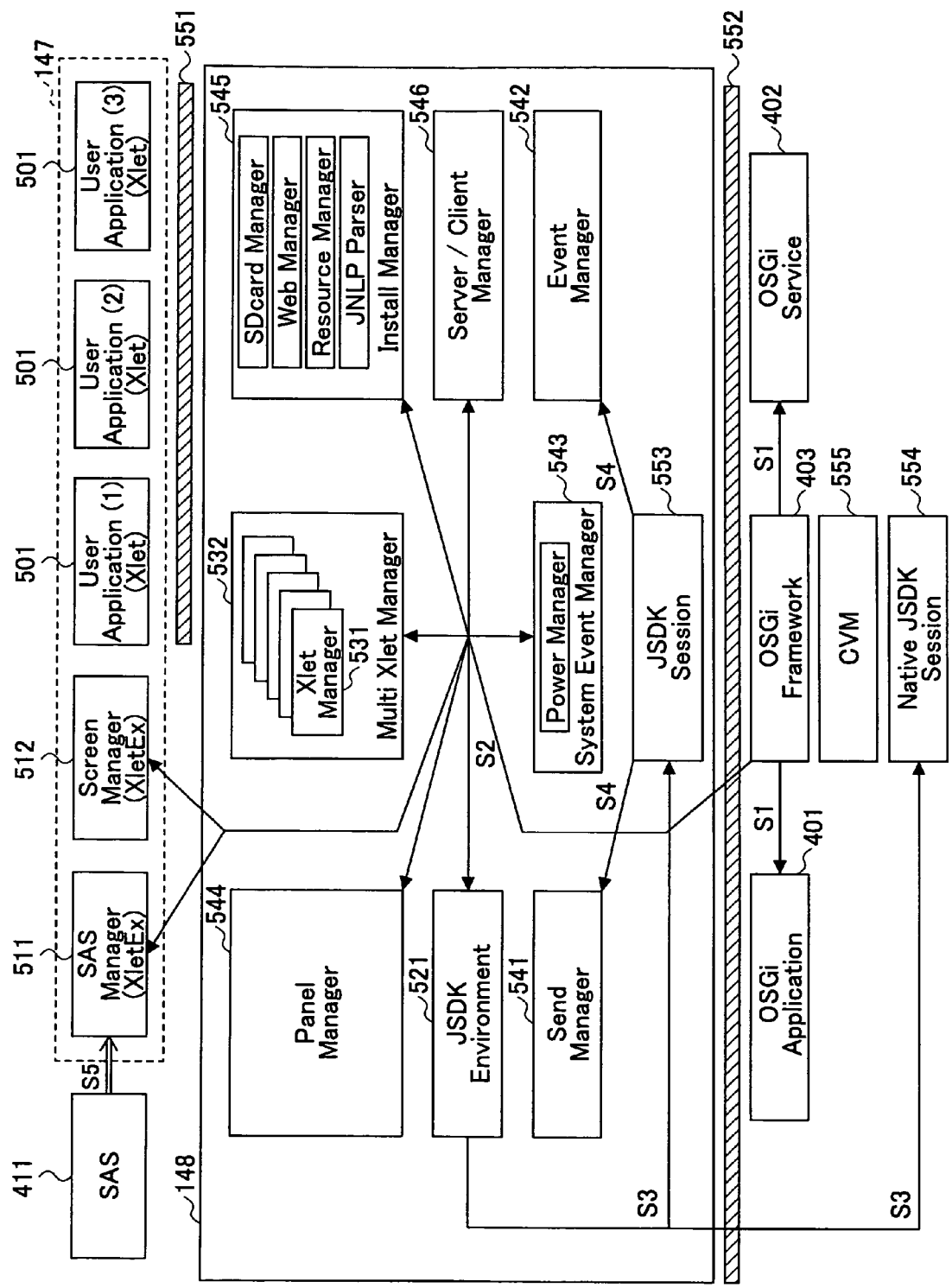
FIG. 19 is a class diagram related to a starting process of a JSDK system.

FIG. 19 is a class diagram related to a starting process of the JSDK system. In the starting process of the JSDK system, the OSGi framework 403 first generates the bundles forming the OSGi applications 401 and the ODGi services 402 (step S1). Next, the OSGi framework 403 generates the bundles forming the JSDK applications 147 and the JSDK platform 148 (step S2). Then, the JSDK environment 521 executes the starting environment setting of the JSDK system reflecting the execution environment of the JSDK system, such as generating the JSDK session 553 and the native JSDK session 554 (step S3). The JSDK session 553 then generates the send manager 541 and the event manager 542 (step S4). The SAS 411 and the SAS manager 511 participate in the starting process of the user application 501.

[Emulator]

Figure 20:
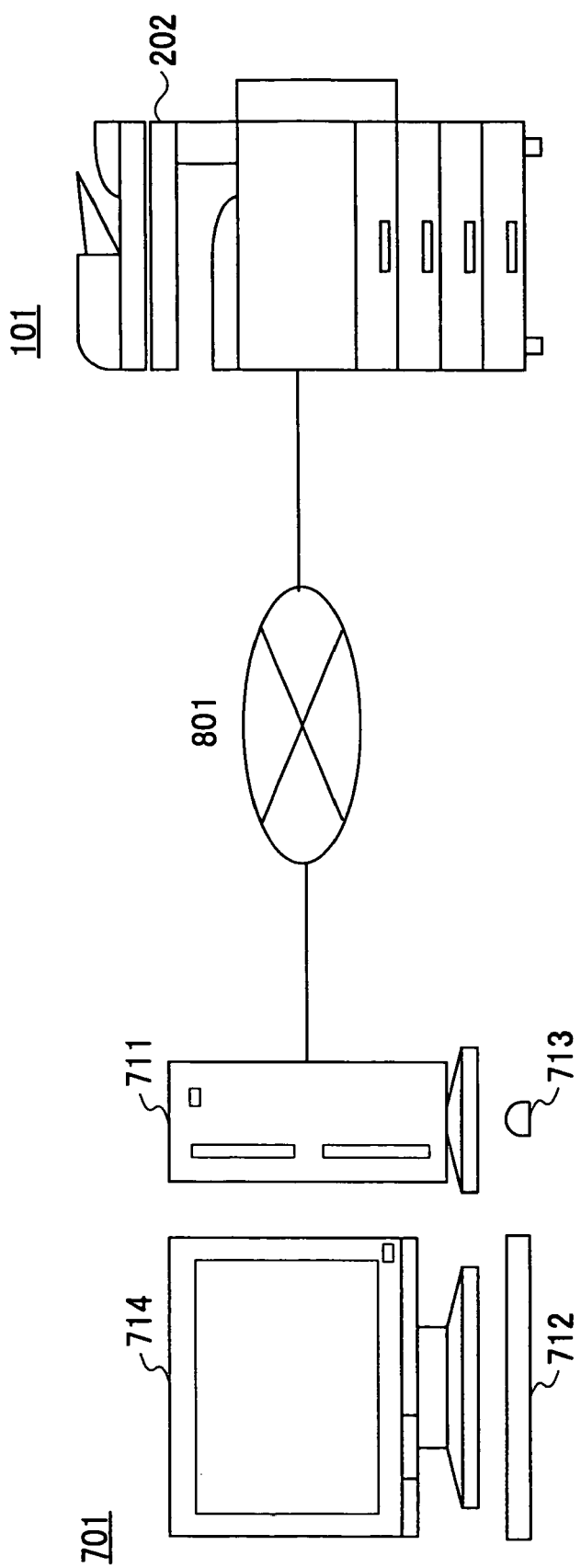
FIG. 20 is a diagram showing a personal computer corresponding to an embodiment of the present invention.

FIG. 20 is a diagram showing a personal computer (PC) corresponding to an embodiment of the present invention. A PC 701 shown in FIG. 20 is connected to the MFP 101 shown in FIG. 1 via a network 801, and functions as an emulator of the MFP 101 shown in FIG. 1.

The PC 701 shown in FIG. 20 includes a main PC body 711, a keyboard 712, a mouse 713, a display 714 and the like. The main PC body 711 includes a CPU, a ROM, a RAM, an NVRAM, an HDD, a MODEM, an NIC and the like. The keyboard 712 and the mouse 713 form a hardware (operation part) for use by the operator to make inputs to the MFP 101, in place of the operation panel 202. The display 714 forms a hardware (display part) for use by the operator to obtain an output from the MFP 101, in place of the operation panel 202.

Figure 21:
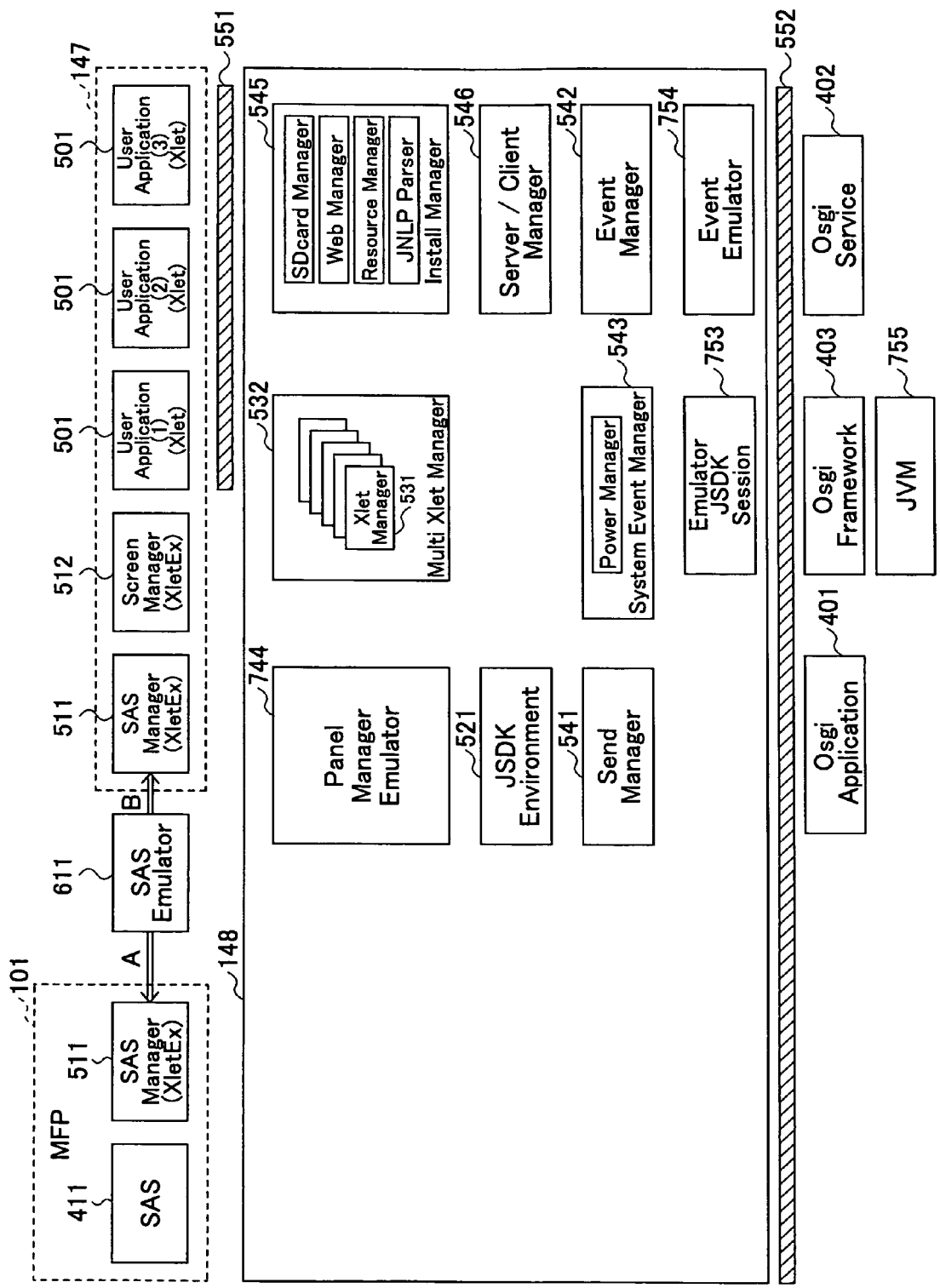
FIG. 21 is a class diagram showing the JSDK applications and the JSDK platform within the personal computer.

FIG. 21 is a class diagram showing the JSDK applications 147 and the JSDK platform 148 within the PC 701 shown in FIG. 20. The JSDK applications 147, the JSDK platform 148, the OSGi applications 401, the OSGi services 402 and the OSGi framework 403, which are similar to those of the MFP 101 shown in FIG. 1, are provided within the PC 701 shown in FIG. 20. The class diagram of the JSDK applications 147 and the JSDK platform 148 within the MFP 101 shown in FIG. 1 is shown in FIG. 18 described above. Accordingly, a description will only be given of the portions of FIG. 21 differing from FIG. 18.

First, the SAS 411 shown in FIG. 18 is replaced by a SAS emulator 611 shown in FIG. 21. Second, the panel manager 544 shown in FIG. 18 is replaced by a panel manager emulator 744 shown in FIG. 21. Third, the JSDK session 553 shown in FIG. 18 is replaced by an emulator JSDK session 753 shown in FIG. 21. Fourth, the native JSDK session 554 shown in FIG. 18 is replaced by an event emulator 754 shown in FIG. 21. Fifth, the CVM 555 shown in FIG. 18 is replaced by a JVM 755 shown in FIG. 21.

The SAS emulator 611 is a CSDK application 146 that controls other CSDK applications 146, and can also control the JSDK applications 147 via the SAS manager 511 within the MFP 101 or the PC 701, as indicated by arrows A and B in FIG. 21. The panel manager emulator 744 is a class for emulating the panel manager 544 and converting an operation on the operation panel 202 into the operation of the keyboard 712 or the mouse 713. The emulator JSDK session 753 is a class for executing a communication path establishing process. The event emulator 754 is a class for emulating the operation of the MFP 101. The JVM 755 is a Java virtual machine for executing the JSDK applications 147, the JSDK platform 148, the OSGi applications 401, the OSGi services 402 and the OSGi framework 403.

Figure 22:
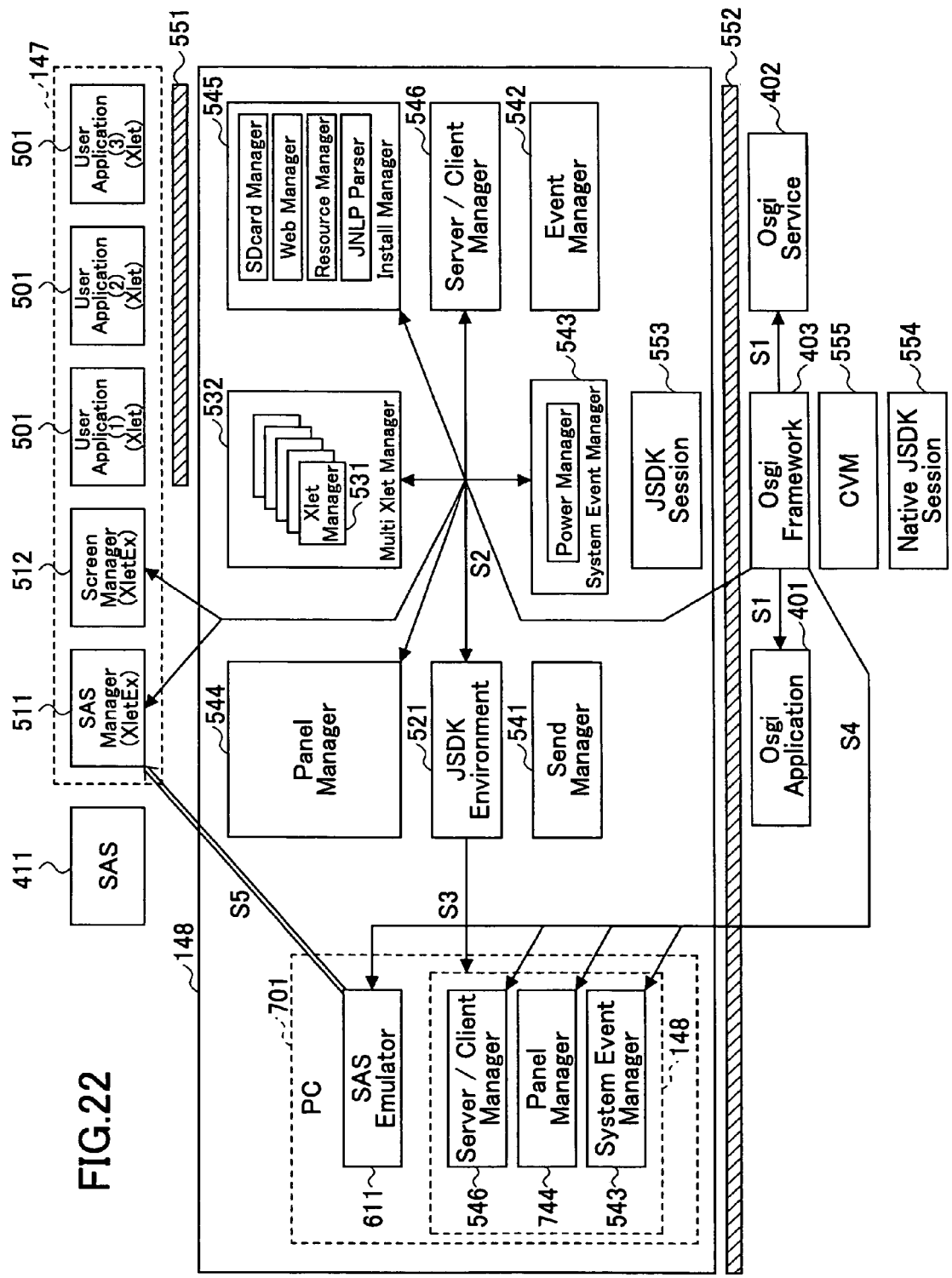
FIG. 22 is a class diagram related to a starting process of a JSDK system.
Figure 23:
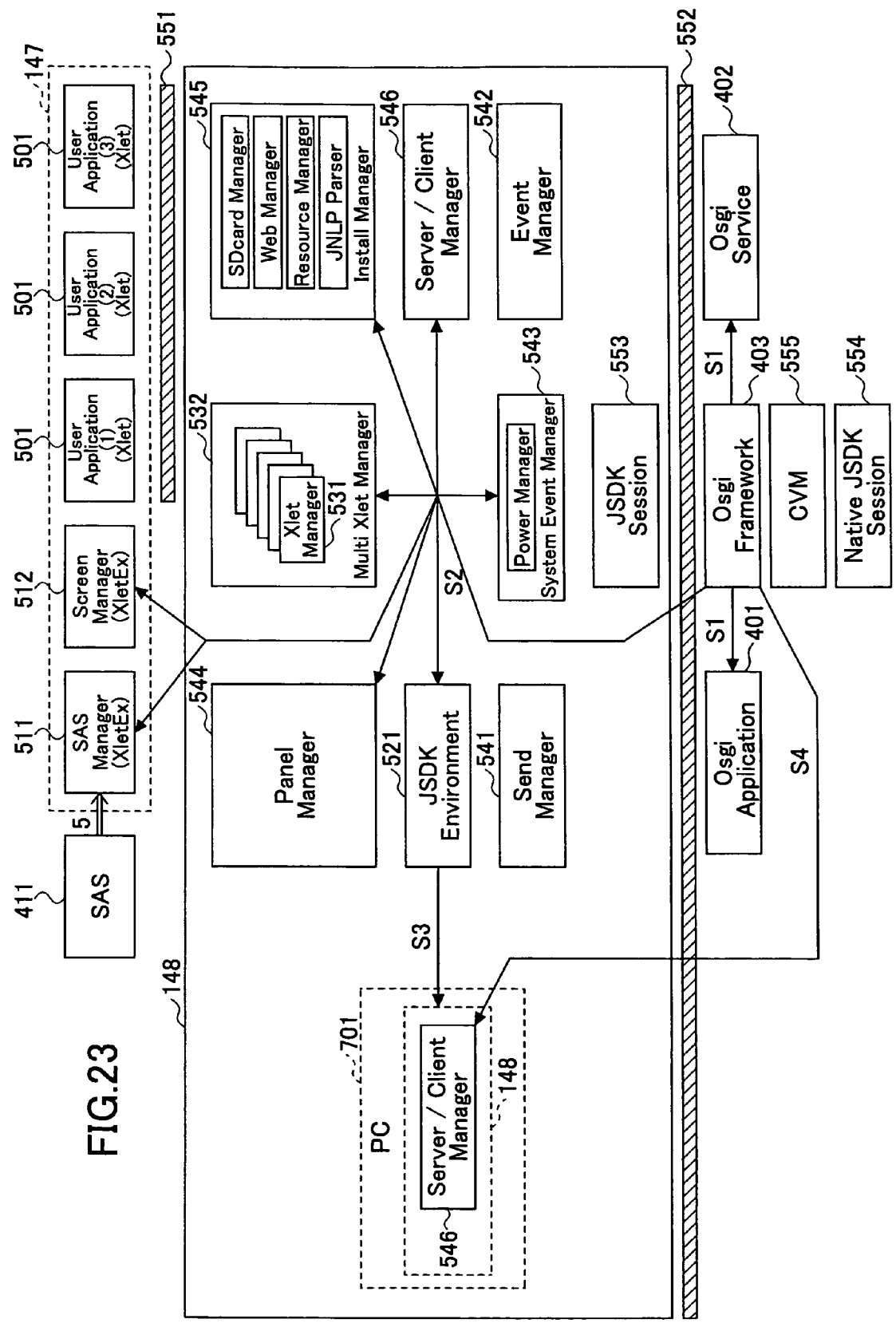
FIG. 23 is a class diagram related to another starting process of a JSDK system.

The starting process of the JSDK system within the PC 701 shown in FIG. 20 is similar to that shown in FIG. 19. In addition, the PC 701 shown in FIG. 20 can remotely operate the MFP 101 shown in FIG. 1, but when remotely operating the MFP 101 shown in FIG. 1 by the PC 701 shown in FIG. 20, the starting process of the JSDK system within the MFP 101 shown in FIG. 1 is carried out as shown in FIG. 22 or FIG. 23. FIG. 22 is a class diagram related to a starting process of the JSDK system, and FIG. 23 is a class diagram related to another starting process of the JSDK system.

First, in place of the process of the step S3 shown in FIG. 19, the JSDK environment 521 within the MFP 101 registers the JSDK platform 148 within the PC 701 (step S3). Second, in place of the process of the step S4 shown in FIG. 19, the OSGi framework 403 within the MFP 101 registers the server/client manager 546 within the PC 701 (step S4).

In FIG. 22, the SAS emulator 611 within the PC 701 participates in the starting process of the user application 501, and thus, in a step S4 shown in FIG. 22, the OSGi framework 403 within the MFP 101 registers the SAS emulator 611 within the PC 701.

In FIG. 23, the SAS 411 within the MFP 101 participates in the starting process of the user application 501, and thus, in a step S4 shown in FIG. 23, the OSGi framework 403 within the MFP 101 does not register the SAS emulator 611 within the PC 701.

The description given above in conjunction with FIGS. 5 through 17 also holds true with respect to the PC 701 shown in FIG. 20, similarly as in the case of the MFP 101 shown in FIG. 1. But in this case, the SAS 411 is understood to correspond to the SAS manager 611.

This application claims the benefit of a Japanese Patent Applications No.2005-202151 filed Jul. 11, 2005, No.2005-202152 filed Jul. 11, 2005, No.2006-158706 filed Jun. 7, 2006 and No.2006-158707 filed Jun. 7, 2006, in the Japanese Patent Office, the disclosures of which are hereby incorporated by reference.

Further, the present invention is not limited to these embodiments, but various variations and modifications may be made without departing from the scope of the present invention.

What is claimed is:

1. An image forming apparatus having a plurality of application execution environments, comprising:
    a first control part in a first application execution environment controls a first group of applications in the first application execution environment; and
    a second group of applications executed in a second application execution environment via a second control part of the second application execution environment, said first control part being a part of the first group of applications, the second control part being a part of the second group of applications, and execution of an application in the first group of applications is performed in a different manner than an application in the second group of applications,
    wherein the first control part receives a request to control an application and determines a type of the application to be controlled and sends the request to the second control part if the request is regarding the second group of applications.

2. The image forming apparatus as claimed in claim 1, comprising:
    an operation screen display part configured to display, on an operation screen having an application in the first application execution environment as an operation target, display information for operating an application in the second application execution environment.

3. The image forming apparatus as claimed in claim 1, wherein each of the application execution environments starts, stops, installs, uninstalls or updates an application executed in the corresponding application execution environment.

4. The image forming apparatus as claimed in claim 1, wherein the first control part of the first application execution environment starts, stops, installs, uninstalls or updates an application of the second group of applications executed in the second application execution environment via the second control part in the second application execution environment.

5. The image forming apparatus as claimed in claim 1, wherein the first and second application execution environments are respectively executed in different process spaces.

6. An information processing method executed in an image forming apparatus having a plurality of application execution environments, comprising:
    a first control procedure of a first application execution environment controlling a first group of applications executed in the first application execution environment;
    a second control procedure of a second application execution environment controlling a second group of applications executed in the second application execution environment;
    the first control procedure controlling the second group of applications executed in the second application execution environment via the second control procedure, and the first control procedure being a part of the first group of applications, and the second control procedure being a part of the second group of applications;
    executing an application in the first group of applications in a different manner than an application in the second group of applications,
    wherein the first control procedure includes receiving a request to control an application and determines a type of the application to be controlled and sends the request to the second control procedure if the request is regarding the second group of applications.

7. The information processing method as claimed in claim 6, comprising:
    an operation screen display procedure displaying, on an operation screen having an application in the first application execution environment as an operation target, display information for operating an application in the second application execution environment.

8. A non-transitory computer readable storage medium that stores a program which, when executed by a computer, causes the computer to perform a process comprising:
    a first control procedure causing the computer to control a first group of applications executed in a first application execution environment;
    a second control procedure causing the computer to control a second group of applications executed in a second application execution environment;
    the first control procedure causing the computer to control the second group of applications executed in the second application execution environment via the second control procedure, and the first control procedure being a part of the first group of applications, and the second control procedure being a part of the second group of applications;
    executing an application in the first group of applications in a different manner than an application in the second group of applications,
    wherein the first control procedure includes receiving a request to control an application and determines a type of the application to be controlled and sends the request to the second control procedure if the request is regarding the second group of applications.

9. The image forming apparatus as claimed in claim 1, further comprising:
    a plurality of second application execution environments, each second application execution environment including a second control part and a plurality of the second group of applications, each second control part is configured to control each of the second group of applications contained a same second application execution environment as the second control part.

10. An image forming apparatus having a plurality of application execution environments, comprising:
    a first control part in a first application execution environment controls a first group of applications in the first application execution environment; and
    a second group of applications executed in a second application execution environment via a second control part of the second application execution environment, said first control part being a part of the first group of applications, the second control part being a part of the second group of applications, and execution of an application in the first group of applications is performed as a process and execution of an application in the second group of applications is performed as a thread,
    wherein the first control part receives a request to control an application and determines a type of the application to be controlled and sends the request to the second control part if the request is regarding the second group of applications.

* * * * *